United States Patent
Matsuhiro et al.

(10) Patent No.: US 9,142,176 B2
(45) Date of Patent: Sep. 22, 2015

(54) STEREOSCOPIC IMAGE DISPLAY APPARATUS

(75) Inventors: Kenji Matsuhiro, Tokyo (JP); Yoshihiro Yoshihara, Niigata (JP); Hiroshi Maruyama, Niigata (JP)

(73) Assignee: ARISAWA MFG. CO., LTD., Niigata (JP)

( * ) Notice: Subject to any disclaimer, the term of this patent is extended or adjusted under 35 U.S.C. 154(b) by 776 days.

(21) Appl. No.: 13/318,251

(22) PCT Filed: Mar. 17, 2011

(86) PCT No.: PCT/JP2011/056459
§ 371 (c)(1),
(2), (4) Date: Mar. 5, 2012

(87) PCT Pub. No.: WO2012/035806
PCT Pub. Date: Mar. 22, 2012

(65) Prior Publication Data
US 2012/0147281 A1    Jun. 14, 2012

(30) Foreign Application Priority Data

Sep. 13, 2010   (JP) ................................. 2010-204823

(51) Int. Cl.
*H04N 13/04*      (2006.01)
*G02B 27/24*      (2006.01)
(Continued)

(52) U.S. Cl.
CPC ............. *G09G 3/3648* (2013.01); *G02B 27/26* (2013.01); *G09G 3/3406* (2013.01);
(Continued)

(58) Field of Classification Search
CPC .......... H04N 15/00; G02B 27/24; G02B 5/30; G09G 3/36
See application file for complete search history.

(56) References Cited

U.S. PATENT DOCUMENTS

| | | | | |
|---|---|---|---|---|
| 2006/0221444 A1* | 10/2006 | Fukaishi et al. | ............... | 359/472 |
| 2008/0036853 A1* | 2/2008 | Shestak et al. | ................... | 348/51 |
| 2010/0149472 A1* | 6/2010 | Hoshi | ............................ | 349/119 |
| 2010/0238097 A1* | 9/2010 | Baik et al. | ........................ | 345/87 |
| 2012/0154698 A1 | 6/2012 | Matsuhiro et al. | | |

FOREIGN PATENT DOCUMENTS

| | | |
|---|---|---|
| CN | 101625467 A | 1/2010 |
| CN | 102449533 A | 5/2012 |

(Continued)

OTHER PUBLICATIONS

Japanese Patent Office Search Report in Japanese Patent Application No. 2011-522723 (Feb. 19, 2013).

(Continued)

*Primary Examiner* — Behrooz Senfi
*Assistant Examiner* — Maryam Nasri
(74) *Attorney, Agent, or Firm* — Leydig, Voit & Mayer, Ltd.

(57) ABSTRACT

A stereoscopic image display apparatus which reduces flicker and crosstalk, provides a viewing screen of high brightness without decreased resolution. The stereoscopic image display apparatus includes a liquid crystal display which has first and second image forming areas having horizontal rows of pixels, and an optical unit in which first and second polarizing areas associated with the first and second image forming areas are arranged. A right eye image is displayed on the first image forming areas and a left eye image is displayed on the second image forming areas, and these areas are alternately replaced or overwritten every time a frame is switched. Phase difference states are replaced between the first polarizing areas and the second polarizing areas of the optical unit, synchronized with replacement of the first and second image forming areas.

12 Claims, 13 Drawing Sheets

(51) Int. Cl.
*G02B 5/30* (2006.01)
*G09G 3/36* (2006.01)
*G02B 27/26* (2006.01)
*G09G 3/34* (2006.01)
*G02F 1/1335* (2006.01)

(52) U.S. Cl.
CPC ...... *H04N 13/0434* (2013.01); *H04N 13/0436* (2013.01); *G02F 2001/133538* (2013.01); *G09G 2300/023* (2013.01); *G09G 2300/0426* (2013.01)

(56) References Cited

FOREIGN PATENT DOCUMENTS

| | | |
|---|---|---|
| GB | 2461733 A | 1/2010 |
| JP | 62-217790 A | 9/1987 |
| JP | 5-232403 A | 9/1993 |
| JP | 10-63199 A | 3/1998 |
| JP | 2003-259395 A | 9/2003 |
| JP | 2007-72217 A | 3/2007 |
| JP | 2008-170557 A | 7/2008 |
| JP | 2009-282329 A | 12/2009 |
| JP | 2010-164956 A | 7/2010 |

OTHER PUBLICATIONS

State Intellectual Property Office of the People's Republic of China, Office Action in Chinese Patent Application No. 20118000129.5, (Dec. 1, 2014).

State Intellectual Property Office of the People's Republic of China; Search Report in Chinese Patent Application No. 20118000129.5, (Dec. 1, 2014).

State Intellectual Property Office of the People'S Republic of China; Office Action in Chinese Patent Application No. 201180001292.5 (Jun. 5, 2015).

* cited by examiner

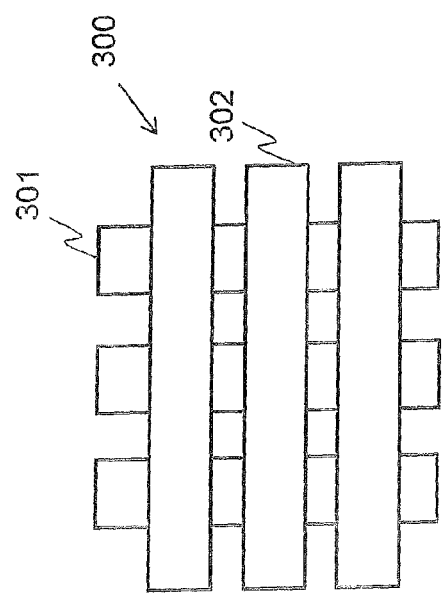
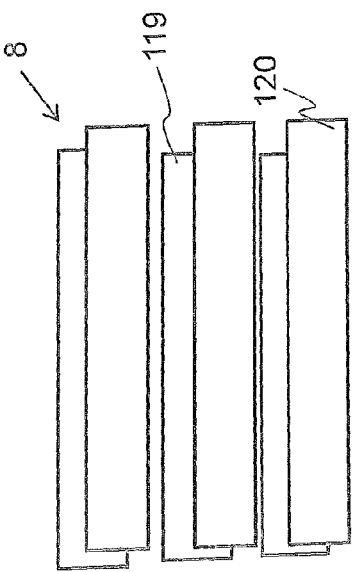

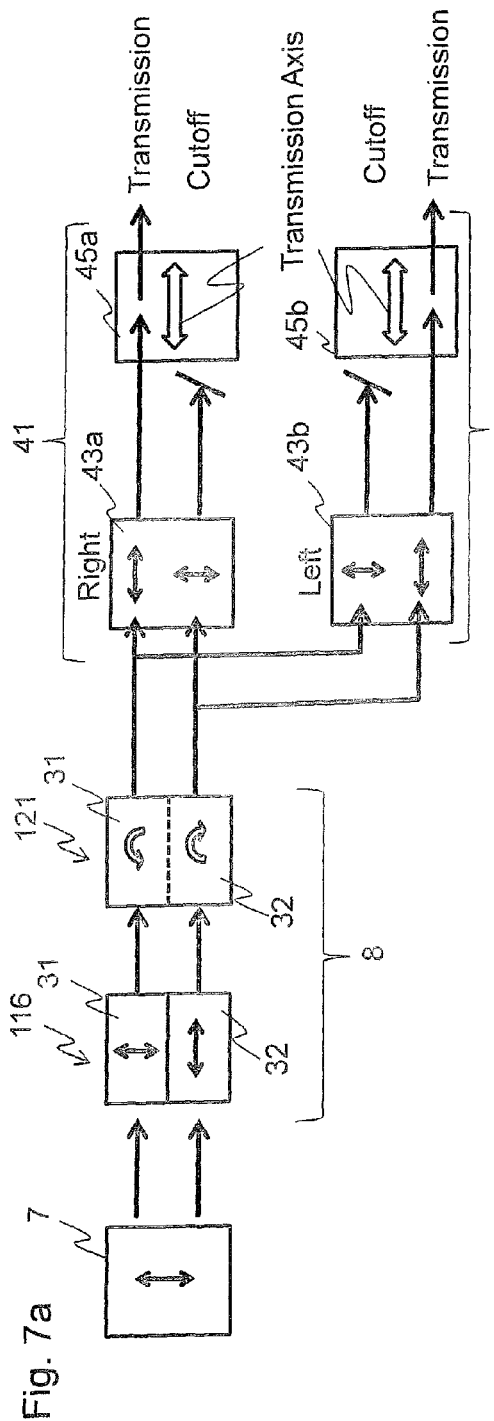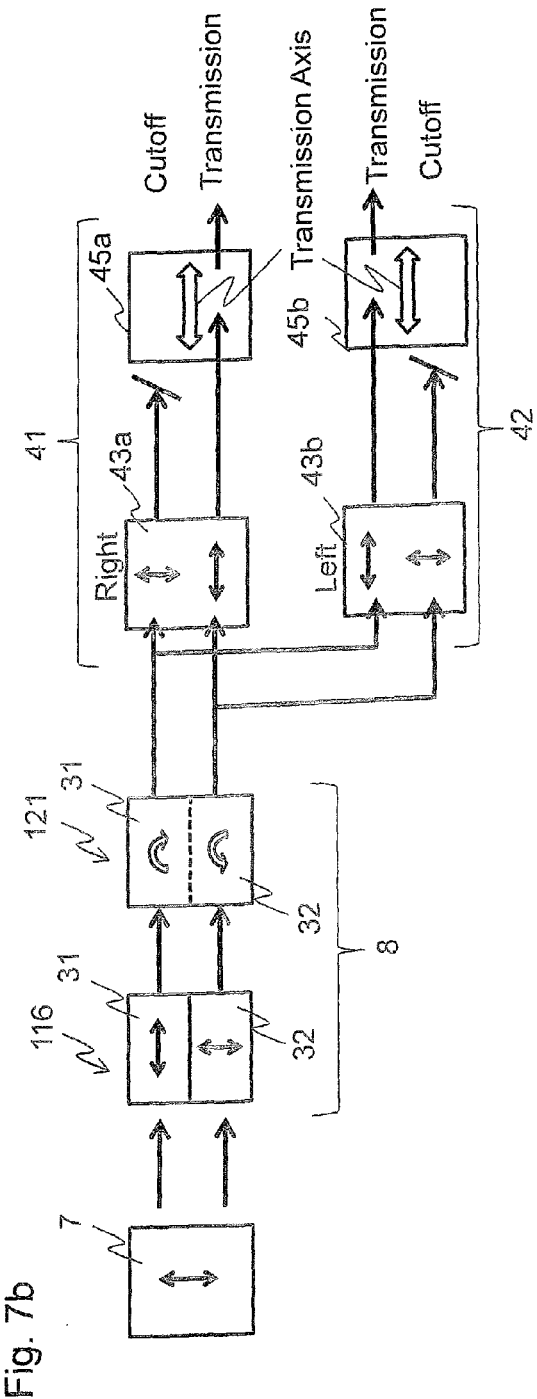

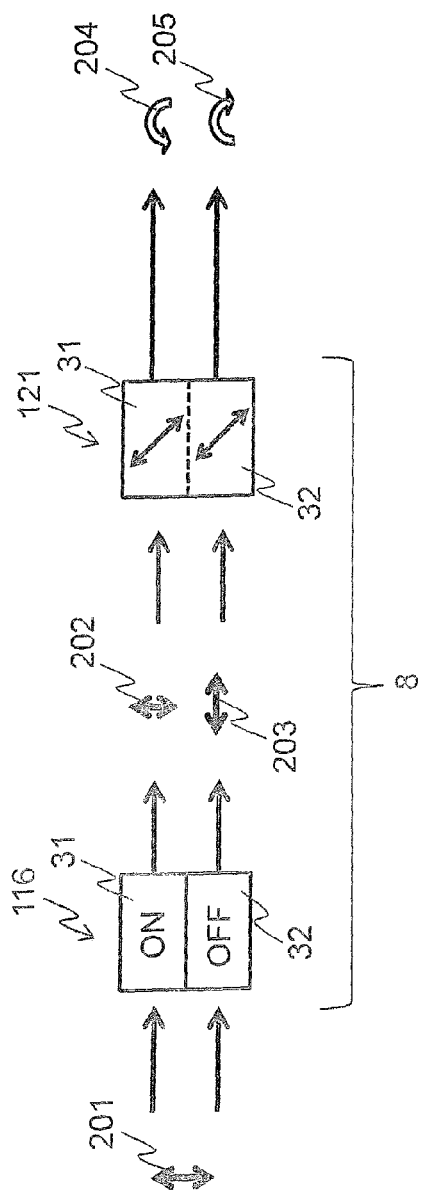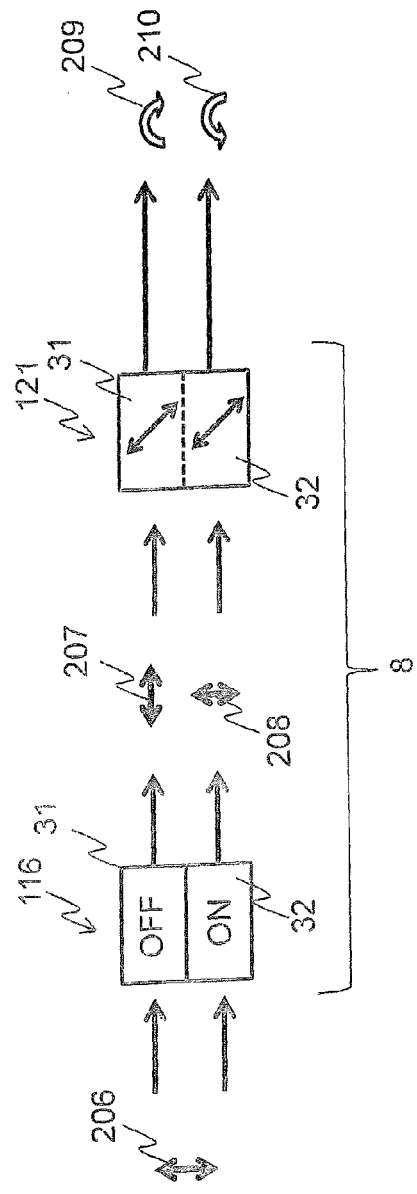

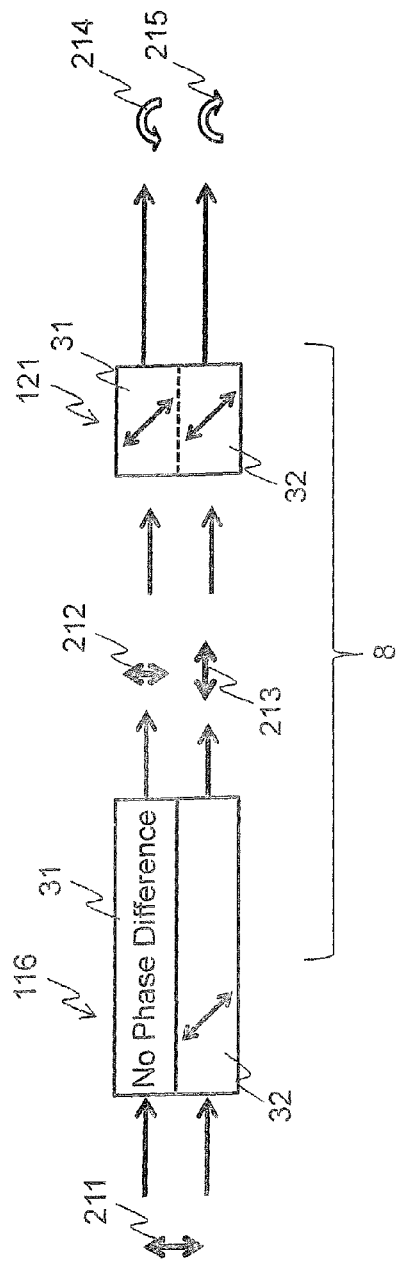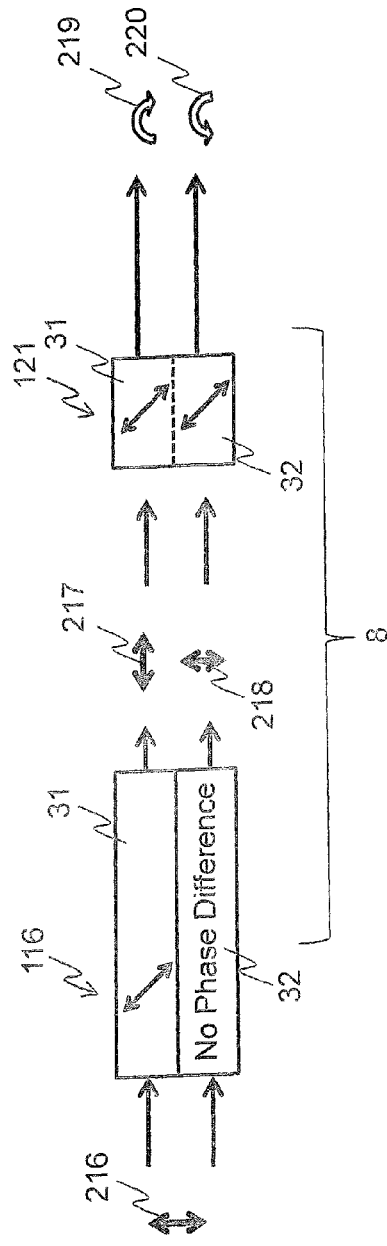

STEREOSCOPIC IMAGE DISPLAY APPARATUS

TECHNICAL FIELD

The present invention relates to a stereoscopic image display apparatus.

BACKGROUND ART

Recently, liquid crystal televisions using liquid crystal displays have been actively developed. Further, as an approach for achieving a higher function of liquid crystal televisions, development of a stereoscopic image display apparatus using a liquid crystal display is being advanced.

A plurality of types of schemes are proposed for this stereoscopic image display apparatus using the liquid crystal display apparatus. For example, a parallax barrier scheme, a lenticular lens scheme and a switch backlight scheme are known. These schemes provide an advantage that a viewer does not need dedicated glasses to view video images from a display apparatus. However, the parallax barrier scheme and the lenticular lens scheme have a problem that, the horizontal resolution decreases and therefore the resolution of image display decreases. The switch backlight scheme has a problem in that flickering of images occur.

Further, as a scheme using dedicated glasses, a shutter glass scheme is known. This scheme provides an advantage of widening a display view angle of an image display apparatus without decreasing the resolution. However, this scheme has problems that flickering of display images occur, the brightness of a display screen decreases and a time lag is produced between images visible to left and right eyes, and therefore natural images cannot be provided for the viewer.

Further, a stereoscopic image display apparatus is recently proposed which uses novel optical units to provide stereoscopic images. For example, Japanese Patent Application Laid-Open No. 10-63199 discloses a stereoscopic image display apparatus which does not require dedicated glasses by using two polarization filters which are such novel optical units.

With the stereoscopic image display apparatus disclosed in Japanese Patent Application Laid-Open No. 10-63199, a right eye polarization filter and a left eye polarization filter having the polarization directions orthogonal to each other are arranged in the front left and right of a light source. Further, respective lights transmitted through these filters are converted into substantially parallel lights by a Fresnel lens and are radiated to a liquid crystal display. Furthermore, linear polarization filter lines in which polarization directions are orthogonal to each other are alternately arranged per horizontal line of polarization filters on the both surfaces of this liquid crystal display, and opposing linear polarization filter lines on the light source side and viewer side have polarization directions which are orthogonal. Still further, the liquid crystal panel of the liquid crystal display is configured to alternately display right eye video information and left eye video information per horizontal line according to transmittance lines of two polarization filters.

That is, all horizontal lines of a display screen are divided into odd lines and even lines and left eye and right eye images are displayed on the respective lines to sort these left eye and right eye images for the left and right eyes of the viewer by means of novel optical units and display stereoscopic images.

This apparatus does not cause stereoscopic images to deteriorate even if a viewing position of a viewer is moved more or less to the left or right. This apparatus can also avoid a phenomenon in which a horizontal resolution decreases by half which is the problem of the parallax scheme and the lenticular lens scheme.

Further, Japanese Patent Application Laid-Open No. 2006-284873 discloses a stereoscopic image display apparatus which uses novel retarders as novel optical units which have two different areas which make polarizing axes of incident lights orthogonal to each other. This stereoscopic image display apparatus has a liquid crystal display which displays a right eye image and a left eye image on different areas, and the retarders corresponding to left and right image display areas, and provides stereoscopic images by projecting parallax images toward the viewer. Further, this stereoscopic image display apparatus is known to display images of a wider view angle.

CITATION LIST

Japanese Patent Application Laid-Open No. Hei 10-63199
Japanese Patent Application Laid-Open No. 2006-284873

SUMMARY OF INVENTION

Technical Problem

However, the stereoscopic image display apparatus using polarization filters disclosed in Japanese Patent Application Laid-Open No. 10-63199 always has a fixed display position for a right eye video signal and a fixed display position for a left eye video signal on the display screen, and therefore has a new problem that vertical resolutions of left and right video images decrease by half.

Further, the stereoscopic image display apparatus using the novel retarders disclosed in Japanese Patent Application Laid-Open No. 2006-284873 has a new problem that, when the viewer views the center in the vertical direction of the stereoscopic display apparatus from a position of a certain view angle, part of a right eye image on the liquid crystal display transmits through a left eye ½ wave plate and reaches the viewer's left eye, thereby causing crosstalk.

Hence, the conventional stereoscopic image display apparatus is not sufficient to reduce flickers and crosstalk, maintain a high brightness in the screen and prevent a decrease in the resolution, and therefore a new stereoscopic image display apparatus is demanded.

The present invention has been made in light of the foregoing. That is, it is therefore an object of the present invention to provide a stereoscopic image display apparatus which reduces flickers and crosstalk, provides a high brightness in the screen and enables simultaneous viewing of left and right video images without decreasing the resolution in the screen.

Other challenges and advantages of the present invention are apparent from the following description.

Solution to Problem

A stereoscopic image display apparatus according to the present invention, comprises:
a liquid crystal display which comprises a liquid crystal panel formed by aligning in a vertical direction a plurality of horizontal lines formed by aligning pixels in a horizontal direction, and a pair of polarizing plates which sandwich the liquid crystal panel;
a backlight which is arranged on a back surface side of the liquid crystal display;
an optical unit which is provided on a front surface side of the liquid crystal display;

polarized glasses which a viewer wears; and a controlling apparatus which controls image display in the liquid crystal display, and phase difference states of the optical unit, wherein the liquid crystal display comprises a first image forming area and a second image forming area which are formed by binding the plurality of horizontal lines continuously arranged in the vertical direction of the liquid crystal panel and are alternately disposed, and in which, according to control by the controlling apparatus, the first image forming area displays one of either a right eye image or a left eye image and the second image forming area simultaneously displays the other image, respectively, the first image forming area and the second image forming area are configured to (1) replace a right eye image and a left eye image every time a frame is switched, or (2) in cases other than (1), replace a right eye image and a left eye image when a frame is switched or overwrite images displayed in a frame immediately before, and in the optical unit, a first polarizing area and a second polarizing area are arranged in a range corresponding to the first image forming area and the second image forming area, and comprise respectively different phase difference states, the different phase difference states being controlled by the controlling apparatus in synchronization with a timing to replace the right eye image and the left eye image.

In the optical unit, controlled by the controlling apparatus, the first polarizing area and the second polarizing area comprise respectively different phase difference states, the different phase difference states being replaced between the first polarizing area and the second polarizing area in synchronization with a timing to replace the right eye image and the left eye image on the liquid crystal display.

The first image forming area and the second image forming area each comprise 2 to 60 horizontal lines continuously arranged in the vertical direction of the liquid crystal panel.

An entire lighting state of the backlight is controlled by the controlling apparatus according to a timing to replace the right eye image and the left eye image, or a part of a lighting state of the backlight is controlled following replacement of phase difference states between the first polarizing area and the second polarizing area to perform scanning.

The controlling apparatus controls replacement of the right eye image and the left eye image on the liquid crystal display by controlling each horizontal line of the liquid crystal display, and in synchronization with the control in each of the horizontal lines controls a phase difference state of the first polarizing area or the second polarizing area of the optical unit associated with the first image forming area or the second image forming area including the controlled horizontal line of the liquid crystal display.

The controlling apparatus sequentially controls each horizontal line from an upper horizontal line of the liquid crystal display to a lower horizontal line to control replacement of a right eye image and a left eye image, and sequentially controls replacement of phase difference states between the first polarizing area and the second polarizing area in the optical unit in synchronization with the control in the liquid crystal display, from top to bottom of the optical unit.

The optical unit sandwiches liquid crystal between a pair of substrates comprising opposing surfaces on which transparent electrodes are disposed, and comprises phase difference films on outer surfaces of the substrates which sandwich the liquid crystal.

A light blocking unit is provided in at least part of a boundary between the first polarizing area and the second polarizing area of the optical unit.

The optical unit is formed using one liquid crystal element selected from the group consisting of a TN liquid crystal element, a homogeneous liquid crystal element and a ferroelectric liquid crystal element.

A substrate forming the optical unit is formed using one film selected from the group consisting of a polycarbonate film, a triacetylcellulose film, a cycloolefin polymer film, a polyether sulfone film and a glass cloth reinforced transparent film.

The liquid crystal display preferably switches frames at a cycle of 120 Hz or more.

The liquid crystal display more preferably switches frames at a cycle of at least 240 Hz.

Advantageous Effects of Invention

The viewer can view only right eye image light with the right eye and view only left eye image light with the left eye. Consequently, the viewer can recognize these right eye image light and left eye image light as stereoscopic images.

Further, according to one aspect of the present invention, the stereoscopic image display apparatus can display stereoscopic images at the full resolution.

Further, right eye and left eye images are simultaneously displayed, so that it is possible to reduce fatigue of the viewer. Furthermore, it is also possible to provide the effect of canceling a sense of difference in a stereoscopic view resulting from misalignment between left and right images which occur in the case of fast moving stereoscopic images.

Still further, according to the aspect of the present invention, it is possible to reduce crosstalk in which part of a right eye image reaches the viewer's left eye when the viewer views the center in the vertical direction of the stereoscopic image display apparatus from the position of a certain view angle.

Moreover, according to the aspect of the present invention, it is possible to display stereoscopic images of a high brightness.

BRIEF DESCRIPTION OF DRAWINGS

FIG. 5 is a view schematically illustrating an electrode structure of a conventional passive driving liquid crystal display element, and a view schematically illustrating an electrode structure of the switching retarder.

FIG. 7 is a view describing a method of making the viewer recognize one frame image and a view describing a method of making the viewer recognize a frame image after image display areas are replaced following switching of a frame.

FIG. 8 illustrates the function of the switching retarder when one frame image is formed, and illustrates the function of the switching retarder when one frame is formed resulting from replacement of image forming areas following switching of a frame.

FIG. 9 illustrates the function of the switching retarder when one frame image is formed, and illustrates the function of the switching retarder when a frame image is formed resulting from replacement of image display areas following switching of a frame.

DESCRIPTION OF EMBODIMENTS

Figure 1:
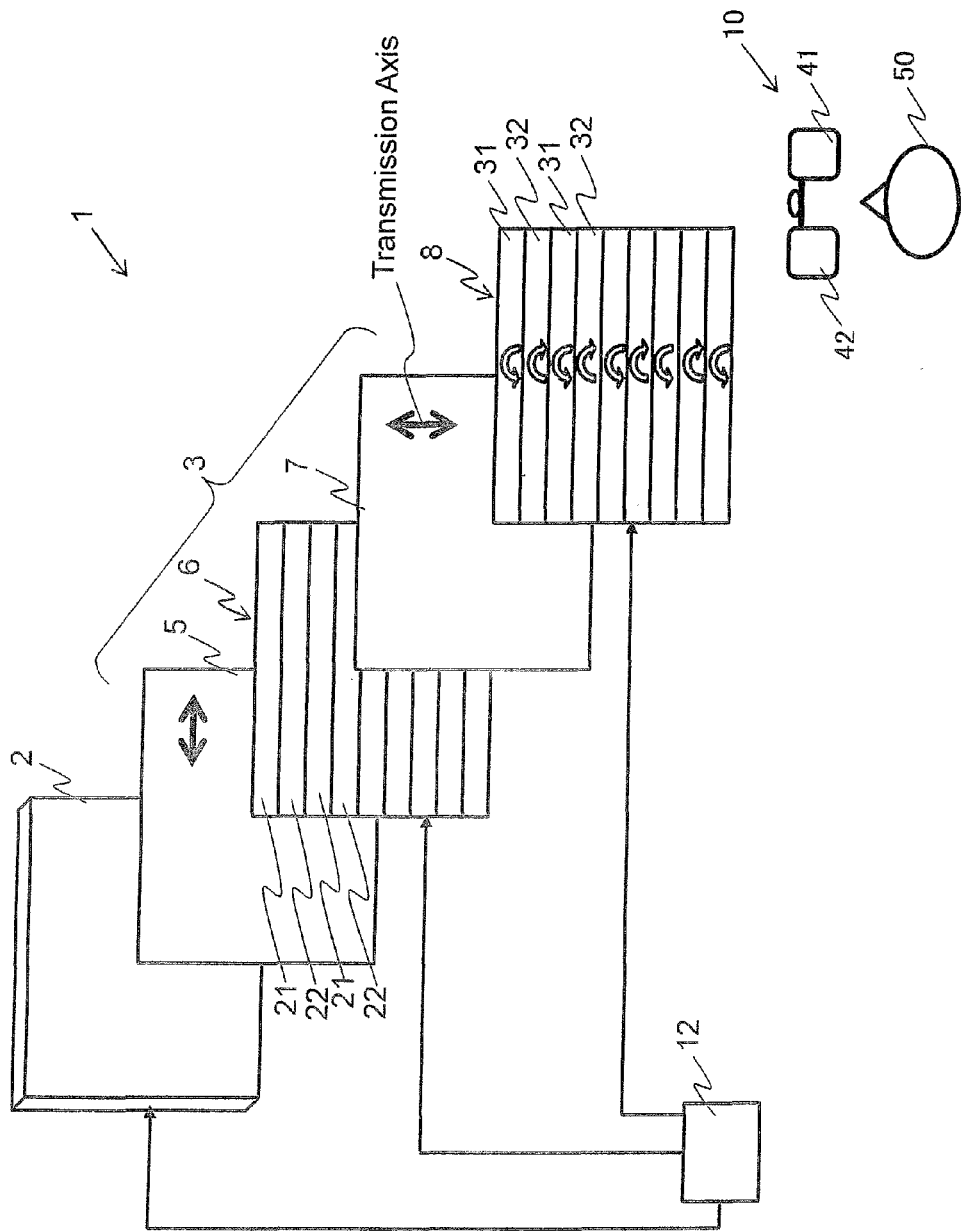
FIG. 1 is a schematic exploded perspective view describing a configuration of the main parts of a stereoscopic image display apparatus according to the present embodiment.

FIG. 1 is a schematic exploded perspective view describing a configuration of the main parts of a stereoscopic image display apparatus 1 according to the present embodiment. As illustrated in FIG. 1, the stereoscopic image display apparatus 1 has a backlight 2, a liquid crystal display 3, and a switching retarder 8 of an optical unit, in this order, and has a controlling apparatus 12 which controls the backlight 2, the liquid crystal display 3 and the switching retarder 8. Further, these are accommodated in a housing (not illustrated). Furthermore, as illustrated in FIG. 1, the stereoscopic image display apparatus 1 has polarized glasses 10. A viewer 50 who views stereoscopic images wears these polarized glasses 10, and views images on the screen from the front surface side of the switching retarder 8.

The backlight 2 is arranged in the farthest side of the stereoscopic image display apparatus 1 seen from the viewer 50. Further, the backlight 2 emits non-polarized white light with a uniform light amount over a polarizing plate 5 in a state where the stereoscopic image display apparatus 1 displays images (hereinafter, "the state of use of the stereoscopic image display apparatus 1"). In addition, although a planar light source is used for the backlight 2 in the present embodiment, a combination of, for example, a point light source such as LED and a condensing lens may be used instead of the planar light source. An example of this condensing lens is a Fresnel lens sheet. The Fresnel lens sheet has on one side surface a lens surface which coaxially has a convexity and concavity, and can convert light incident from the focus in the center of the back side into substantially parallel light and emit the light toward the front surface. Further, the backlight 2 according to the present embodiment can perform so-called scanning lighting with respect to the liquid crystal display 3.

As illustrated in FIG. 1, the liquid crystal display 3 is formed with a liquid crystal panel 6 sandwiched by a pair of the polarizing plate 5 and polarizing plate 7.

The polarizing plate 5 is disposed on the backlight 2 side in the liquid crystal panel 6 in the liquid crystal display 3. The polarizing plate 5 has a transmission axis and an absorption axis orthogonal to the transmission axis. Hence, when non-polarized light emitted from the backlight 2 is incident on the polarizing plate 5, the polarizing plate 5 allows transmission of light of non-polarized light having the polarizing axis parallel to a transmission axis direction, and blocks light having the polarizing axis parallel to the absorption axis direction. Meanwhile, the direction of the polarizing axis refers to a vibration direction of the electric field of light. The direction of the transmission axis in the polarizing plate 5 refers to a direction parallel to the horizontal direction in which the viewer 50 looks at the stereoscopic image display apparatus 1 as indicated by the arrow in FIG. 1.

Figure 2:
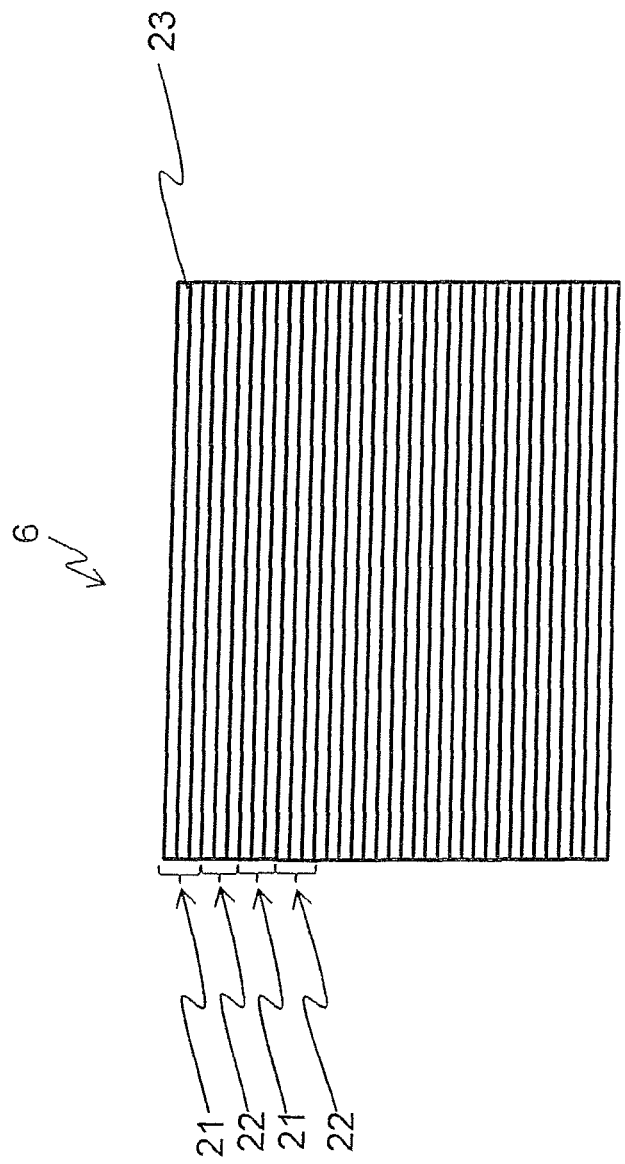
FIG. 2 is a schematic plan view of the liquid crystal panel forming the stereoscopic image display apparatus according to the present embodiment.

FIG. 2 is a schematic plan view of the liquid crystal panel 6 forming the stereoscopic image display apparatus 1 according to the present embodiment. As illustrated in FIG. 2, the liquid crystal panel 6 is formed by aligning in the vertical direction a plurality of horizontal lines 23 formed by aligning pixels (not illustrated) in the horizontal direction.

Further, the liquid crystal panel 6 is formed by sandwiching a liquid crystal by means of, for example, glass substrates on which electrodes subjected to necessary patterning are provided. The electrodes are made of, for example, ITO (Indium Tin Oxide). Further, it is possible to use for the liquid crystal panel 6 a liquid crystal panel of a TN (Twisted Nematic) mode, IPS (In-Plane-Switching) mode or VA (Vertical Alignment) mode. With these liquid crystal panels, the orientation of a liquid crystal changes according to the voltage to be applied. Further, the liquid crystal panel 6 is combined with the functions of the polarizing plates 5 and 7 disposed on both surfaces of the liquid crystal panel 6 to enable adjustment of the transmission light amount.

Further, the liquid crystal panel 6 according to the present embodiment is a component which forms images in the stereoscopic image display apparatus 1, and simultaneously displays a right eye image and a left eye image on one screen. Hereinafter, this configuration and image display function will be described.

As illustrated in FIG. 1, the image display portion of the liquid crystal panel 6 is partitioned in the horizontal direction to provide first image forming areas 21 and second image forming areas 22. As illustrated in FIG. 1, these first image forming areas 21 and second image forming areas 22 have substantially the same area obtained by partitioning the liquid crystal panel 6 in the horizontal direction. Further, a plurality of first image forming areas 21 and second image forming areas 22 are alternately arranged in the vertical direction.

In addition, although not illustrated in FIG. 1, an outer frame is arranged in the periphery of the liquid crystal panel 6, and the first image forming areas 21 and the second image forming areas 22 in the liquid crystal panel 6 are supported by this outer frame.

Further, as illustrated in FIG. 2, with the liquid crystal panel 6 of the stereoscopic image display apparatus 1 according to the present embodiment, the first image forming areas 21 and the second image forming areas 22 are each formed with a plurality of horizontal lines 23 which are continuously aligned in the vertical direction and can be independently controlled. In this case, with the liquid crystal panel 6 illustrated in FIG. 2, the first image forming areas 21 and the second image forming areas 22 are each formed with three continuously aligned horizontal lines 23.

As a result, the uppermost first horizontal line to the third horizontal line of the liquid crystal panel 6 are bound as one set to form the first image forming area 21. Further, the fourth horizontal line to the sixth horizontal line are bound as one set to form the second image forming area 22. Furthermore, the seventh horizontal line to the ninth horizontal line are further bound to form the first image forming area 21, and the tenth horizontal line to the twelfth horizontal line are bound to form the second image forming area 22. That is, with the liquid crystal panel 6 illustrated in FIG. 2, three each of the horizontal lines 23 are sequentially bound to form one set. Further, a plurality of first image forming areas 21 and second image forming areas 22 are alternately arranged in the liquid crystal panel 6 in association with respective sets.

Meanwhile, the number of horizontal lines 23 for forming the first image forming areas 21 and the second image forming areas 22 is not limited to three illustrated in FIG. 2, and may be arbitrarily plural. For example, the number of horizontal lines 23 for forming the first image forming areas 21 and the second image forming areas 22 may be ten.

In this case, the uppermost first horizontal line to the tenth horizontal line in the liquid crystal panel 6 are bound as one set to form the first image forming area 21. Further, the eleventh horizontal line to the twentieth horizontal line are bound as one set to form the second image forming area 22. Furthermore, the twenty-first horizontal line to the thirtieth horizontal line are further bound to form the first image forming area 21, and the thirty-first horizontal line to the fortieth horizontal line are bound to form the second image forming area 22. Still further, ten each of the horizontal lines 23 are sequentially bound such that a plurality of first image forming areas 21 and second image forming areas 22 are alternately arranged in the liquid crystal panel 6.

That is, as described later, from the viewpoint of reducing crosstalk and widening the view angle of the liquid crystal display 3, the number of horizontal lines 23 for forming the first image forming areas 21 and the second image forming areas 22 is selected.

Further, with the liquid crystal panel 6 of the liquid crystal display 3 of the stereoscopic image display apparatus 1, a right eye image and a left eye image are displayed respectively on the first image forming areas 21 and the second image forming areas 22 of one frame image. Furthermore, according to the following methods described in (1) and (2), the right eye image and the left eye image are replaced between the first image forming areas 21 and the second image forming areas 22.

(1) A right eye image and a left eye image are replaced every time a frame is switched.

(2) In cases other than (1), when a frame is switched, a right eye image and a left eye image are replaced or the images displayed in a frame immediately before are overwritten. Meanwhile, the case of (2) does not include a case where the first image forming areas 21 and the second image forming areas 22 respectively maintain a right eye image and a left eye image without replacing the right eye image and the left eye image.

Next, as described above, in the state where the stereoscopic image display apparatus 1 is used, one frame image is displayed, and, for example, a right eye image and a left eye image are formed respectively on the first image forming areas 21 and the second image forming areas 22 of the liquid crystal panel 6. When light transmitted through the polarizing plate 5 is incident on the first image forming areas 21 and the second image forming areas 22 of the liquid crystal panel 6, transmitted light of the first image forming areas 21 becomes image light for the right eye image (hereinafter abbreviated as "right eye image light") and transmitted light of the second image forming areas 22 becomes image light for the left eye image (hereinafter abbreviated as "left eye image light"). Further, in the case where the right eye image and the left eye image are replaced following switching of a frame, a left eye image and a right eye image are formed respectively on the first image forming areas 21 and the second image forming areas 22.

In addition, when one frame image is displayed as described above, right eye image light transmitted through the first image forming areas 21 and left eye image light transmitted through the second image forming areas 22 transmit through the polarizing plate 7 (described later), and become linear polarized lights having polarized axes in respective specific directions. Meanwhile, the polarizing axes in respective directions may be mutually the same direction. In the example illustrated in FIG. 1, the respective polarizing axes are mutually the same direction as the direction of the transmission axis of the polarizing plate 7.

Further, as illustrated in FIG. 1, the polarizing plate 7 on the liquid crystal panel 6 is arranged on the viewer 50 side in the liquid crystal display 3. When the above right eye image light transmitted through the first image forming areas 21 and left eye image light transmitted through the second image forming areas 22 are incident on the polarizing plate 7, the polarizing plate 7 allows transmission of light of these lights having the polarizing axis parallel to the transmission axis. Further, the polarizing plate 7 blocks the light having the polarizing axis parallel to the absorption axis (vertical to the transmission axis). As indicated by the arrow in FIG. 1, the direction of the transmission axis in the polarizing plate 7 is a direction vertical to the horizontal direction when the viewer 50 looks at the stereoscopic image display apparatus 1.

Next, the switching retarder 8 which is arranged on the viewer 50 side of the polarizing plate 7 is a main optical unit which forms images together with the liquid crystal display 3 in the stereoscopic image display apparatus 1 according to the present embodiment.

Figure 3:
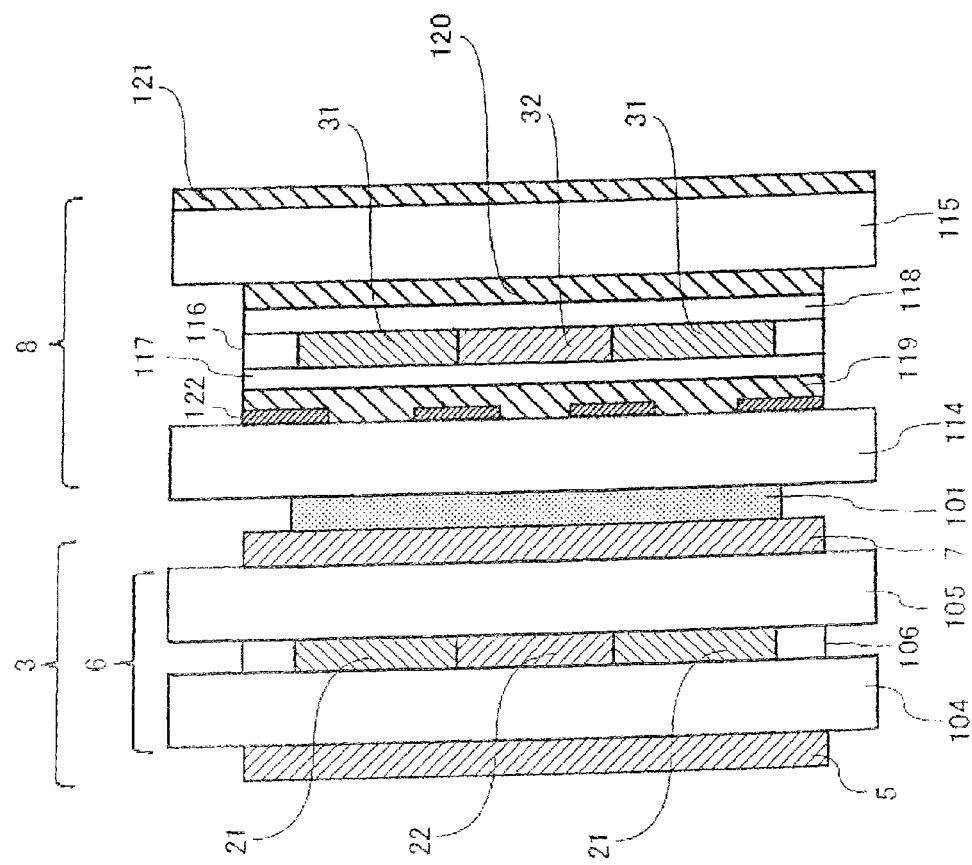
FIG. 3 is a schematic sectional view of the liquid crystal display portion and switching retarder portion of the stereoscopic image display apparatus according to the present embodiment.

The switching retarder 8 according to the present embodiment has first polarizing areas 31 and second polarizing areas 32. As illustrated in FIGS. 1 and 3 (described below), the positions and sizes of the first polarizing areas 31 and the second polarizing areas 32 in this switching retarder 8 correspond to the ranges, that is, the positions and sizes, of the first image forming areas 21 and the second image forming areas 22 in the liquid crystal panel 6.

Further, as described above, in the liquid crystal panel 6 of the stereoscopic image display apparatus 1 according to the present embodiment illustrated in FIG. 2, three each of the horizontal lines 23 of all horizontal lines for displaying images on the liquid crystal panel 6 are sequentially bound from the top in the vertical direction to form one set. Hence, as illustrated in FIG. 1, the positions and sizes of the first polarizing areas 31 and the second polarizing areas 32 in this switching retarder 8 correspond to the positions and sizes of the first image forming areas 21 and the second image forming areas 22 which are sets of three bound horizontal lines of the liquid crystal panel 6.

Further, there are also cases where, in the liquid crystal panel 6, for example, ten horizontal lines are sequentially bound to form one set, thereby forming the first image forming areas 21 and the second image forming areas 22. In these cases, the positions and sizes of the first polarizing areas 31 and the second polarizing areas 32 in the switching retarder 8 correspond to the positions and sizes of the first image forming areas 21 and the second image forming areas 22 which are sets of the ten bound horizontal lines.

Accordingly, in the state where the stereoscopic image display apparatus 1 is used, when one frame image is displayed, right eye image light transmitted through the first image forming areas 21 in the above case is incident on the first polarizing areas 31 of the switching retarder 8. Further, left eye image light transmitted through the second image forming areas 22 in the above case is incident on the second polarizing areas 32. Furthermore, in the case where image forming areas of the right eye image and the left eye image in the liquid crystal panel 6 are replaced following switching of a frame, left eye image light transmitted through the first image forming areas 21 is incident on the first polarizing areas 31 of the switching retarder 8. Still further, right eye image light transmitted through the second image forming areas 22 is incident on the second polarizing areas 32.

Moreover, the switching retarder 8 according to the present embodiment can switch the phase difference states respectively in the first polarizing areas 31 and the second polarizing areas 32.

FIG. 3 is a schematic sectional view of the liquid crystal display 3 portion and switching retarder 8 portion of the stereoscopic image display apparatus 1 according to the present embodiment. As illustrated in FIG. 3, the liquid crystal display 3 and the switching retarder 8 are preferably layered in the stereoscopic image display apparatus 1, and fixed to each other by an adhesive 101 without a gap.

As described above, the liquid crystal display 3 has the liquid crystal panel 6 sandwiched by a pair of the polarizing plate 5 and polarizing plate 7. This liquid crystal panel 6 is formed by sandwiching the liquid crystal 106 by means of a pair of the substrate 104 and substrate 105. Further, the above multiple first image forming areas 21 and second image forming areas 22 are alternately arranged in this image display portion.

Further, as illustrated in FIG. 3, the switching retarder 8 which is the optical unit has a pair of opposing substrate 114 and substrate 115. Transparent electrodes 119 and 120 made of, for example, ITO are disposed on respective opposing surfaces of the substrates 114 and 115. Oriented films 117 and 118 for orienting the liquid crystal are provided on these transparent electrodes 119 and 120. Hence, the switching retarder 8 is formed by sandwiching liquid crystal 116 by means of a pair of the substrates 114 and 115 having these transparent electrodes 119 and 120 and oriented films 117 and 118. Consequently, the switching retarder 8 can induce a change of an orientation of the liquid crystal 116 by applying the voltage to the transparent electrodes 119 and 120 on the substrates 114 and 115.

In this case, in the switching retarder 8, the transparent electrodes 119 and 120 on the substrates 114 and 115 are patterned or different orientation processings are applied to the oriented films 117 and 118 per area corresponding to the first image forming areas 21 and the second image forming areas 22. Consequently, it is possible to change the orientation state of the liquid crystal 116 per area corresponding to the first image forming areas 21 and the second image forming areas 22 of the liquid crystal panel 6. By this means, with the switching retarder 8, the first polarizing areas 31 and the second polarizing areas 32 are provided to correspond to the ranges, that is, the positions and sizes, of the first image forming areas 21 and the second image forming areas 22 of the liquid crystal panel 6. Further, the first polarizing areas 31 and the second polarizing areas 32 independently can induce a change of an orientation of the liquid crystal.

Further, in the switching retarder 8, a phase difference film 121 is disposed on the front surface side which is the viewer 50 side. Further, the phase difference film 121 of the switching retarder 8 forms a ¼ wave plate having the optical axis in a direction of the upper right at 45 degrees (the upper right at 45 degrees in the drawing) from the horizontal direction when, for example, the viewer 50 looks at the stereoscopic image display apparatus 1. Further, between the substrate 114 and the transparent electrode 119 provided on the substrate 114 and in the positions corresponding to the boundary areas between the first polarizing areas 31 and the second polarizing areas 32, black stripes 122 (described below) are provided as light blocking units.

According to the above configuration, in the state where the stereoscopic image display apparatus 1 is used, when one frame image is displayed, right eye image light transmitted through the first image forming areas 21 is incident on the first polarizing areas 31. Further, left eye image light transmitted through the second image forming areas 22 is incident on the second polarizing areas 32. Further, in the case where image forming areas of a right eye image and a left eye image are replaced following switching of a frame, left eye image light transmitted through the first image forming areas 21 is incident on the first polarizing areas 31. Further, right eye image light transmitted through the second image forming areas 22 is incident on the second polarizing areas 32.

Moreover, the switching retarder 8 according to the present embodiment can change the orientation of the liquid crystal 116 as described above, and change phase difference states of the first polarizing areas 31 and the second polarizing areas 32. In this case, it is possible to independently change phase difference states of the first polarizing areas 31 and the second polarizing areas 32. Consequently, when image forming areas of a right eye image and a left eye image are replaced in the liquid crystal display 3 following switching of a frame, in synchronization with this replacement, the switching retarder 8 can switch respective phase difference states of the first polarizing areas 31 and the second polarizing areas 32.

That is, when the image forming areas of a right eye image and a left eye image are replaced following switching of a frame, after switching of the frame, the second polarizing areas 32 can have the phase difference state which the first polarizing areas 31 had before switching of a frame. Similarly, after switching of the frame, the first polarizing areas 31 can have the phase difference state which the second polarizing areas 32 had before switching of the frame.

In addition, as described above, with the stereoscopic image display apparatus 1 according to the present embodiment, the first image forming areas 21 and the second image forming areas 22 in the liquid crystal panel 6 of the liquid crystal display 3 are formed with a plurality of horizontal lines 23. Further, with the switching retarder 8, the first polarizing areas 31 and the second polarizing areas 32 are provided to correspond to the range of the first image forming areas 21 and the second image forming areas 22 of the liquid crystal panel 6, and can independently select the phase difference states.

In this case, in the liquid crystal panel 6, the first image forming areas 21 and the second image forming areas 22 can also be provided in association with each one of all horizontal lines for displaying images on the liquid crystal panel 6. In this case, also in the switching retarder 8, the first polarizing areas 31 and the second polarizing areas 32 are formed to correspond to the positions and sizes of the first image forming areas 21 and the second image forming areas 22 associated with each horizontal line 23.

Further, a right eye image and a left eye image are displayed respectively on the first image forming areas 21 associated with odd horizontal lines of one frame image to be displayed and the second image forming areas 22 associated with even horizontal lines. Further, it is possible to, for example, display a frame image interlacing the right eye image and the left eye image respectively by alternately replacing the horizontal lines for displaying the right eye image and the left eye image, for example, every time a frame is switched.

However, in this case, the problem of crosstalk becomes significant.

That is, there are cases where the viewer 50 views stereoscopic images on the stereoscopic image display apparatus 1 at a view angle from the center in the vertical direction of the liquid crystal display 3 forming the screen of the stereoscopic image display apparatus 1. Originally, when one frame image is displayed, only right eye image light transmitted through the first image forming areas 21 of the liquid crystal panel 6 needs to be incident on the first polarizing areas 31 of the switching retarder 8. Further, only left eye image light transmitted through the second image forming areas 22 needs to be incident on the second polarizing areas 32. By contrast with this, when the lower or upper view angle is great, there are cases where part of right eye image light transmitted through the first image forming areas 21 of the liquid crystal panel 6 is incident on the second polarizing areas 32 on which only left eye image light originally needs to be incident, and reaches the left eye of the viewer 50 together with the left eye image light.

Hence, by taking into account the problem of this crosstalk, it is necessary to form the first image forming areas 21 and the second image forming areas 22 in the liquid crystal panel 6, form the first polarizing areas 31 and the second polarizing areas 32 in the switching retarder 8 and further improve the structure.

This type of crosstalk which is the problem is caused because the first polarizing areas 31 and the second polarizing areas 32 having different phase difference characteristics are provided adjacent to each other in the switching retarder 8 to correspond to the liquid crystal panel 6.

That is, as described above, in the liquid crystal panel 6 of the stereoscopic image display apparatus 1 according to the present embodiment, for example, three each of the horizontal lines 23 are sequentially bound from the top in the vertical direction to form one set. Further, the first image forming areas 21 and the second image forming areas 22 having the same area are provided in association with respective sets of the bound horizontal lines. Hence, the corresponding first polarizing areas 31 and second polarizing areas 32 of the switching retarder 8 are provided to be adjacent to each other. Therefore, crosstalk is likely to occur when the viewer 50 views images on the screen at a certain view angle in the up and down directions of the screen of the stereoscopic image display apparatus 1.

Further, this type of crosstalk occurs at boundary areas between the first polarizing areas 31 and the second polarizing areas 32 of the switching retarder 8 which are adjacent to each other. Hence, to reduce this crosstalk, first of all, it is effective to reduce the boundary areas between the adjacent first polarizing areas 31 and second polarizing areas 32 in the switching retarder 8.

For example, when the liquid crystal panel 6 has 1080 horizontal lines according to the full HD (full high definition) specification, it is possible to provide the first image forming areas 21 and the second image forming areas 22 in association with each of all horizontal lines respectively as described above. In this case, 540 first image forming areas 21 and 540 second image forming areas 22 are alternately provided. Further, the switching retarder 8 has 540 first polarizing areas 31 and 540 second polarizing areas 32 corresponding to the positions and sizes of the first image forming areas 21 and the second image forming areas 22 of the liquid crystal panel 6. As a result, 1079 boundary areas between the adjacent first polarizing areas 31 and second polarizing areas 32 are formed.

Further, when the viewer 50 views images on the screen of the stereoscopic image display apparatus 1 from above at a certain view angle, crosstalk occurs at each boundary area. Furthermore, its strength becomes the highest in the case where the first image forming areas 21 and the second image forming areas 22 are provided in association with all horizontal lines respectively as described above.

By contrast with this, as illustrated in FIGS. 1 and 2, the first image forming areas 21 and the second image forming areas 22 of the liquid crystal panel 6 according to the present embodiment are formed with a plurality of horizontal lines 23. Further, the first polarizing areas 31 and the second polarizing areas 32 are formed in the switching retarder 8 to correspond to the positions and sizes of the first image forming areas 21 and the second image forming areas 22 of the liquid crystal panel 6. Therefore, these areas of the first image forming areas 21 and the second image forming areas 22 of the switching retarder 8 increase in proportion to the number of horizontal lines 23 to be bound as sets in the liquid panel 6. As a result, it is possible to reduce the boundary areas between the adjacent first polarizing areas 31 and second polarizing areas 32 in the switching retarder 8.

That is, the boundary areas between the adjacent first polarizing areas 31 and second polarizing areas 32 which cause crosstalk are reduced, so that crosstalk occurring in the stereoscopic image display apparatus 1 is reduced as a whole. Consequently, in proportion to an increase in the number of horizontal lines 23 to be bound as sets to form the first image forming areas 21 and the second image forming areas 22 of the liquid crystal panel 6, crosstalk is more suppressed and the viewer 50 is less likely to notice crosstalk.

Accordingly, the stereoscopic image display apparatus 1 according to the present embodiment reduces crosstalk, thereby expanding a view angle and improving the angle-of-view characteristics.

In view of the above, from the viewpoint of reducing crosstalk and improving the angle-of-view characteristics, the number of horizontal lines 23 to be bound as one set to form the first image forming areas 21 and the second image forming areas 22 of the liquid crystal panel 6 is preferably greater.

Meanwhile, as described above, this type of crosstalk occurs in the boundary areas between the adjacent first polarizing areas 31 and second polarizing areas 32 of the switching retarder 8. Hence, as illustrated in FIG. 3, it is effective to provide the black stripes 122 which are light blocking units in the boundary areas between the first polarizing areas 31 and the second polarizing areas 32 in the surface of the switching retarder 8 opposing to the liquid crystal display 3. The black stripes 122 preferably have a belt shape and, as illustrated in FIG. 3, are disposed at positions corresponding to the boundary areas between the first polarizing areas 31 and the second polarizing areas 32.

By providing these black stripes 122, it is possible to absorb and block image light which goes beyond the boundary areas and is incident on the adjacent first polarizing areas 31 among right eye image light or left eye image light which needs to be incident on the second polarizing areas 32 adjacent to the first polarizing areas 31 of the switching retarder 8.

Similarly, by providing these black stripes 122, it is possible to absorb and block image light which goes beyond the boundary areas and is incident on the adjacent second polarizing areas 32 among right eye image light or left eye image light which needs to be incident on the first polarizing areas 31 adjacent to the second polarizing areas 32 of the switching retarder 8.

Consequently, by providing the black stripes 122 in the switching retarder 8 as the light blocking units, it is possible to make crosstalk less likely to occur in the stereoscopic image display apparatus 1.

Further, with the switching retarder 8, patterning is applied to the transparent electrodes 119 and 120 on the substrates 114 and 115 or the above orientation processing is applied to the oriented films 117 and 118 per polarizing area. Consequently, as described above, it is possible to change the orientation of the liquid crystal 116 such that the first polarizing areas 31 and the second polarizing areas 32 have respectively different phase difference states in association with the first image forming areas 21 and the second image forming areas 22 of the liquid crystal panel 6. Therefore, there is a concern in the switching retarder 8 that disclination of the liquid crystal occurs due to different orientation changes of the liquid crystal in the boundaries between the first polarizing areas 31 and the second polarizing areas 32.

Consequently, by providing the black stripes 122, it is possible to cover disclination of the liquid crystal which occurs in the boundaries between the adjacent first polarizing areas 31 and second polarizing areas 32. As a result, it is possible to prevent disclination of the liquid crystal from influencing right eye image light or left eye image light.

These black stripes 122 are generally formed by photo-etching and relief-forming a deposited chrome thin film according to a photolithography method. Further, this black stripe 122 is preferably made of a material in which a filler component is dispersed in a binder resin. For the filler component, metal particles and their oxides, or pigment and dye are used. The color hue of the filler component is preferably black with respect to the above right eye image light and left eye image light. For the binder resin in which the above pigment and dye are dispersed or dissolved, a common resin such as acrylic resin, urethane resin, polyester, novolac resin, polyimide, epoxy resin, vinyl chrolide-vinyl acetate copolymer, cellulose nitrate, or combinations thereof can be used.

The black stripes 122 having the above effect need to be formed taking the following into account.

That is, as illustrated in FIG. 3, the switching retarder 8 and the liquid crystal display 3 are arranged in the stereoscopic image display apparatus 1. Hence, the surface of the liquid crystal display 3 to which the polarizing plate 7 is attached opposes to the surface of the switching retarder 8 in which the black stripes 122 are provided. Further, the liquid crystal display 3 and the switching retarder 8 are positioned in respective planar directions such that the first polarizing areas 31 and the second polarizing areas 32 of the switching retarder 8 oppose to the first image forming areas 21 and the second image forming areas 22 of the liquid crystal panel 6, respectively.

Hence, the black stripes 122 function to block part of image light transmitting through the liquid crystal display 3 and reaching the eyes of the viewer 50. That is, although the black stripes 122 are effective to reduce crosstalk, the screen brightness in image display in the stereoscopic image display apparatus 1 decreases.

For example, when the first image forming areas 21 and the second image forming areas 22 are provided in association with each of all horizontal lines as described above, the number of boundary areas between the adjacent first polarizing areas 31 and second polarizing areas 32 is at its largest. Further, the number of black stripes 122 arranged for boundary areas is at its largest. As a result, the influence of a decrease in the screen brightness due to formation of the black stripes 122 becomes most significant.

Hence, in the switching retarder 8, while the black stripes 122 are formed to effectively reduce crosstalk, from the viewpoint of brightness in the screen, the number of black stripes 122 to be formed is preferably as little as possible.

In this case, as illustrated in FIGS. 1 and 2, in the liquid crystal panel 6 according to the present embodiment, it is possible to form the first image forming areas 21 and the second image forming areas 22 with a plurality of horizontal lines 23. Further, in the switching retarder 8, as described above, the areas of the first polarizing areas 31 and the second polarizing areas 32 correspond to the first image forming areas 21 and the second image forming areas 22. Hence, these areas increase in proportion to the number of horizontal lines 23 to be bound as one set in the liquid crystal panel 6. Consequently, it is possible to reduce the boundary areas between the adjacent first polarizing areas 31 and second polarizing areas 32 in the switching retarder 8, by forming the first image forming areas 21 and the second image forming areas 22 with a plurality of horizontal lines 23 in the liquid crystal panel 6. Further, it is possible to reduce the number of black stripes 122 formed in the boundary areas.

As a result, when the viewer 50 views stereoscopic images using the stereoscopic image display apparatus 1 according to the present embodiment, the viewer 50 can have stereoscopic images of a high brightness for which a decrease in the brightness in the screen by the black stripes 122 is reduced.

Next, when the structure of the switching retarder 8 is focused upon from the viewpoint of improving crosstalk, it is effective to make substrates forming the switching retarder 8 more preferable.

As illustrated in FIG. 3, it is possible to select and use transparent and strong glass substrates for the substrates 114 and 115 forming the switching retarder 8. However, there is a concern that the substrates 114 and 115 become thicker and the above crosstalk further occurs.

Consequently, it is preferable to select and use thinner substrates for the substrates 114 and 115 while maintaining the strength and transparency.

It is possible to select, for these substrates 114 and 115, a polycarbonate (PC) film, tri-acetyl-cellulose (TAC) film, cycloolefin polymer (COP) film, or polyether sulfone (PES) film. Further, it is preferable to use a transparent organic-inorganic compound film which combines glass and epoxy resin, that is, a glass cloth reinforced transparent film.

The glass cloth reinforced transparent film is manufactured as follows.

First, a long glass cloth is impregnated with resin, and dried to a half-cured state. Further, the glass cloth is cut to an appropriate size in this half-cured state, and then is subjected to heating processing such as pressing at a temperature at which the resin is cured to make a desired glass cloth reinforced transparent film.

This glass reinforced transparent film adopts a structure in which the glass cloth is layered in a matrix of, for example, an epoxy resin, and has a low coefficient of thermal expansion in the planar direction of the glass cloth in particular.

The glass cloth reinforced transparent film has high heat resistance, and dimensional stability with respect to the temperature and moisture. Further, high transparency is realized by making optical properties of the epoxy resin and glass similar. Further, it is possible to improve the gas barrier property by covering the film with silicon dioxide, and form ITO on the surface.

Consequently, when this glass cloth reinforced transparent film is used for the substrates 114 and 115, it is possible to reduce the thickness and weight of the substrates 114 and 115, and prevent the substrates 114 and 115 from being easily cracked.

According to the above study result, from the viewpoint of reducing crosstalk and suppressing a decrease in a brightness in the screen in the stereoscopic image display apparatus 1, the number of horizontal lines 23 to be bound as one set to form the first image forming areas 21 and the second image forming areas 22 of the liquid crystal panel 6 is preferably plural. Moreover, the number of horizontal lines 23 to be bound as one set is preferably increased as much as possible.

Further, with the switching retarder 8, the areas of the first polarizing areas 31 and the second polarizing areas 32 are preferably made greater to correspond to the positions and sizes of the first image forming areas 21 and the second image forming areas 22 of the liquid crystal panel 6. Further, at the same time, it is preferable to make the substrates 114 and 115 forming the switching retarder 8 thinner.

Next, the number of horizontal lines 23 formed as one set to form the first image forming areas 21 and the second image forming areas 22 of the liquid crystal panel 6, and the sizes of the corresponding first polarizing areas 31 and second polarizing areas 32 of the switching retarder 8 will be studied.

That is, with the stereoscopic image display apparatus 1 according to the present embodiment, it is possible to infinitely increase the number of horizontal lines 23 to be bound as one set in the liquid crystal panel 6 according to the above study. However, in this case, the same known problem as the above described conventional stereoscopic image display apparatus occurs. That is, the conventional stereoscopic image display apparatus of a shutter glass scheme has the problems that flickering of display images occur, the brightness on the display screen decreases and a time lag is produced between images visible to the left and right eyes, and therefore the viewer 50 cannot view natural images. Further, also with the stereoscopic image display apparatus 1 according to the present embodiment, when the number of horizontal lines 23 to be bound as one set in the liquid crystal panel 6 is infinitely increased, the same problems occur.

Hence, in the stereoscopic image display apparatus 1 according to the present embodiment, it is necessary to take into account prevention of flickers and to provide natural stereoscopic images for the viewer 50 while taking into account reduction of crosstalk and suppression of a decrease in the brightness in the screen. Further, based on these contradicting viewpoints, it is preferable to select the number of horizontal lines 23 to be bound as sets to form the first image forming areas 21 and the second image forming areas 22 of the liquid crystal panel 6. Furthermore, it is preferable to select optimal substrates in the switching retarder 8, and form the first polarizing areas 31 and the second polarizing areas 32 to correspond to the first image forming areas 21 and the second image forming areas 22 of the liquid crystal panel.

Further, based on a result of the devoted study, it is found that, in the stereoscopic image display apparatus 1 according to the present embodiment, the first image forming areas 21 and the second image forming areas 22 of the liquid crystal panel 6 are preferably formed with two to sixty horizontal lines 23 continuously aligned in the vertical direction of the liquid crystal panel 6.

Further, it is found that, in the stereoscopic image display apparatus 1 according to the present embodiment, the first image forming areas 21 and the second image forming areas 22 of the liquid crystal panel 6 are more preferably formed with three to thirty horizontal lines 23 continuously aligned in the vertical direction of the liquid crystal panel 6. Furthermore, it is found that the first image forming areas 21 and the second image forming areas 22 are most preferably formed with five to fifteen horizontal lines 23. Furthermore, it is preferable to form the first polarizing areas 31 and the second polarizing areas 32 of the switching retarder 8 at the positions and sizes corresponding to the first image forming areas 21 and the second image forming areas 22.

Next, the function of the switching retarder 8 forming the stereoscopic image display apparatus according to the present embodiment, and polarized glasses 10 will be described.

As illustrated in FIG. 3, for example, right eye image light is incident on the first polarizing areas 31 of the switching retarder 8 as linear polarized light having the polarizing axis in the direction vertical to the horizontal direction. Further, selection of the orientation state of the liquid crystal 116 and the function of the phase difference film 121 enable this incident right eye image light to be output as counterclockwise circular polarized light. Further, similarly in this case, with the second polarizing area 32, selection of the orientation state of the liquid crystal 116 and the function of the phase difference film 121 enable incident left eye image light to be output as clockwise circular polarized light.

Next, performing switching in the switching retarder 8 and changing the orientation state of the liquid crystal 116 realize different orientation states of the liquid crystal 116 in the first polarizing areas 31 and the second polarizing areas 32. In this case, the change of the orientation state and the function of the phase difference film 121 enable left eye image light incident on the first polarizing areas 31 to be output as clockwise circular polarized light. Further, with the second polarizing area 32, selection of the orientation state of the liquid crystal 116 and the function of the phase difference film 121 enable incident right eye image light to be output as counterclockwise circular polarized light.

Accordingly, for example, right eye image light transmitted through the first polarizing areas 31 and left eye image light transmitted through the second polarizing areas 32 become circular polarized lights with the rotation directions opposite to each other as indicated by the arrows illustrated in FIG. 1. In addition, the arrows in the switching retarder 8 in FIG. 1 schematically indicate the rotation directions of polarized lights transmitted through this switching retarder 8.

Further, in the stereoscopic image display apparatus 1, a diffusing plate may be arranged closer to the viewer 50 than the switching retarder 8 as described above. That is, the stereoscopic image display apparatus 1 may have a diffusing plate which diffuses right eye image light and left eye image light transmitted through the first polarizing areas 31 and the second polarizing areas 32 of the switching retarder 8 in at least one of the horizontal direction and vertical direction. For this diffusing plate, a lenticular lens sheet in which a plurality of D-shaped convex lenses (cylindrical lenses) extending in, for example, the horizontal direction or vertical direction are arranged, or a lens array sheet in which a plurality of convex lenses are arranged in a plane shape is used.

When the viewer 50 views stereoscopic images using the stereoscopic image display apparatus 1, the viewer 50 views right eye image light and left eye image light projected from the stereoscopic image display apparatus 1 wearing the polarized glasses 10. In these polarized glasses 10, a right eye glass 41 is arranged in the position corresponding to the right eye of the viewer 50 and a left eye glass 42 is arranged in the position corresponding to the left eye.

FIG. 4 is a schematic exploded perspective view describing configurations of the right eye glass 41 and the left eye glass 42. Specifically, FIG. 4(*a*) illustrates the configuration of the left eye glass 42, and FIG. 4(*b*) illustrates the configuration of the right eye glass 41.

Figure 4B:
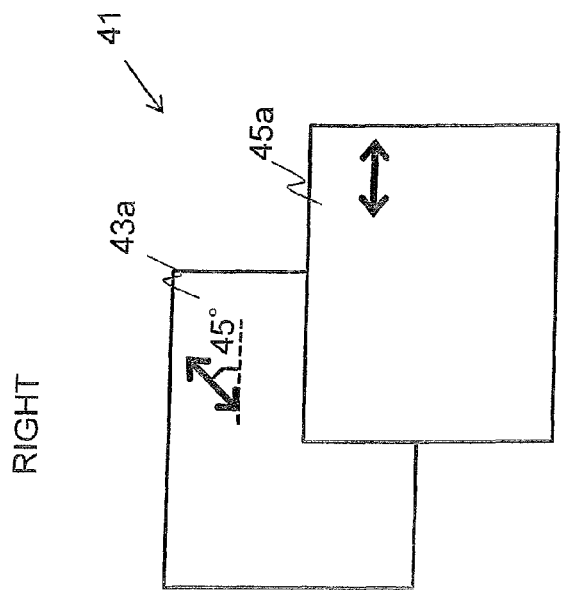
FIG. 4 is a schematic exploded perspective view describing configurations of the right eye glass and the left eye glass.
Figure 4A:
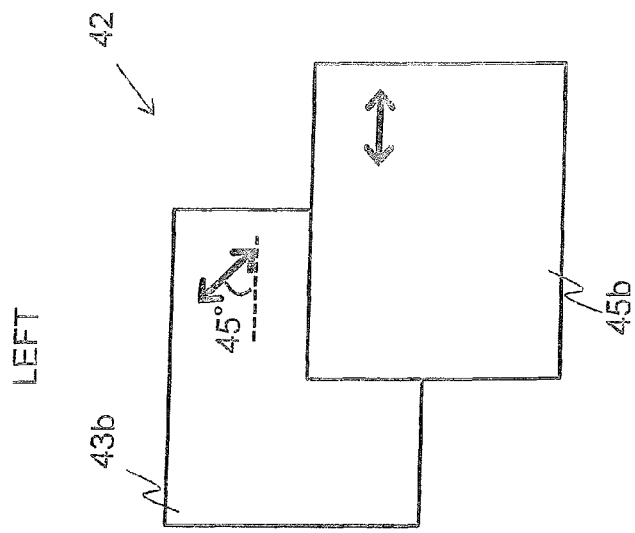

As illustrated in FIGS. 4(a) and 4(b), the right eye glass 41 and the left eye glass 42 forming the polarized glasses 10 have ¼ wave plates 43a and 43b and polarizing plates 45a and 45b, respectively, in this order, and these are fixed to the frame.

In this case, with the polarized glasses 10 according to the present embodiment, when the viewer 50 faces the liquid crystal display 3 wearing the polarized glasses 10, the optical axis of the ¼ wave plate 43a of the right eye glass 41 is in a direction of the upper right at 45 degrees (the upper right at 45 degrees in the drawings) from the horizontal direction. Further, the transmission axis of the polarizing plate 45a is in a direction parallel to the horizontal direction. Hence, right eye image light and left eye image light which are respectively circular polarized lights transmitted through the first polarizing areas 31 and the second polarizing areas 32 of the switching retarder 8 of the stereoscopic image display apparatus 1 are incident on the ¼ wave plates 43a and 43b provided in the right eye glass 41 and the left eye glass 42 and output as linear polarized lights according to the functions of the ¼ wave plates 43a and 43b.

Although the main configuration of the stereoscopic image display apparatus 1 according to the present embodiment has been described, more specific configuration examples of the switching retarder 8 which is the main part of the stereoscopic image display apparatus 1 according to the present embodiment will be described next.

As illustrated in FIG. 3, the switching retarder 8 of the stereoscopic image display apparatus 1 according to the present embodiment can induce a change of the orientation of the liquid crystal 116 by applying the voltage to the transparent electrodes 119 and 120 on the substrates 114 and 115. The switching retarder 8 can be formed using various liquid crystal modes used for the liquid crystal display. For example, the switching retarder 8 can be formed with a TN (Twisted Nematic) liquid crystal element, homogeneous liquid crystal element or ferroelectric liquid crystal element.

Hereinafter, configuration examples of the switching retarder 8 according to the present embodiment will be described using FIG. 3. In addition, common members of each configuration example will be assigned common reference numerals for ease of description.

First, a manufacturing method and configuration using a TN liquid crystal element will be described as the first configuration example of the switching retarder 8 according to the present embodiment.

To manufacture the switching retarder 8 using a TN liquid crystal element, the substrates 114 and 115 formed with glass cloth reinforced transparent films are first prepared. Further, as described above, the black stripes 122 patterned in a belt shape are formed on the substrate 115 on the front surface side. Next, transparent conductive layers (for example, ITO films) having the thicknesses of 100 nm to 140 nm are formed on the respective substrates 114 and 115 using the sputtering method. Then, the transparent electrodes 119 and 120 are formed by patterning the transparent conductive layers using the photolithography method.

Then, the oriented films 117 and 118 having the thicknesses of 50 nm are formed on the transparent electrodes 119 and 120 using a spin coating method such that the liquid crystal is horizontally oriented at a predetermined pre-tilting angle, and rubbing processing is applied to these oriented films 117 and 118. In this case, the rubbing processing is applied to the oriented films 117 and 118 such that the rubbing directions are orthogonal to each other when the substrates 114 and 115 are arranged to oppose to each other.

Next, a pair of the substrates 114 and 115 is adhered such that a cell gap which is an inter-substrate distance therebetween is 5.2 μm. More specifically, both the substrates are fixed by coating plastic spacers (not illustrated) on one substrate, arranging a pair of the substrates 114 and 115 to oppose to each other, and curing a pair of the substrates 114 and 115 by a thermosetting adhesive printed in the surrounding of the display area.

Then, the liquid crystal 116 is formed by filling a liquid crystal material in the gap between the substrates 114 and 115 using a vacuum injection method. Meanwhile, for the liquid crystal material, a nematic liquid crystal material is used which has the refractive index anisotropy (Δn) of 0.0924 and contains 0.15 wt % of an optically-active material CB15.

By so doing, the liquid crystal 116 is placed in a 90 degree twisted orientation state in the initial state where no voltage is applied to the liquid crystal 116. Hence, by inducing the change of the orientation of the liquid crystal 116, the switching retarder 8 using the TN liquid crystal element functions to switch between two states, i.e., a state where the liquid crystal 116 optically rotates at 90 degrees and the state where the liquid crystal 116 does not have such an optical rotation. In addition, when the liquid crystal 116 optically rotates at 90 degrees, the switching retarder 8 using the TN liquid crystal element can output image light which is incident as linear polarized light having the polarizing axis in a direction vertical to the horizontal direction, as linear polarized light parallel to the horizontal direction.

Next, the switching retarder 8 using the TN liquid crystal element is positioned to correspond to the pixels of the above liquid crystal display 3 for displaying pixels. Then, the switching retarder 8 is adhered by means of the adhesive 101.

Next, a manufacturing method and configuration using a homogeneous liquid crystal element will be described as a second configuration example of the switching retarder 8 according to the present embodiment.

To manufacture the switching retarder 8 using the homogeneous liquid crystal element, the substrates 114 and 115 formed with glass cloth reinforced transparent films are first prepared. Further, the black stripes 122 patterned in a belt pattern are formed on the substrate 115 on the front surface side as described above. Next, transparent conductive layers (for example, ITO films) having the thicknesses of 100 nm to 140 nm are formed on the respective substrates 114 and 115 using the sputtering method. Then, the transparent electrodes 119 and 120 are formed by patterning the transparent conductive layers using the photolithography method.

Then, the oriented films 117 and 118 having the thicknesses of 50 nm are formed on the transparent electrodes 119 and 120 using the spin coating method such that the liquid crystal is horizontally oriented at a predetermined pre-tilting angle, and rubbing processing is applied to these oriented films 117 and 118. The rubbing processing is applied to these oriented films 117 and 118 such that the rubbing directions are parallel to each other when the substrates 114 and 115 are arranged to oppose to each other and the orientation direction is in the direction of the upper left at 45 degrees (the upper left at 45 degrees in the drawings) when the viewer 50 looks at the stereoscopic image display apparatus 1.

Next, a pair of the substrates 114 and 115 is adhered such that a cell gap which is an inter-substrate distance therebetween is 1.03 μm. More specifically, both the substrates are fixed by coating plastic spacers (not illustrated) on one substrate, arranging a pair of the substrates 114 and 115 to oppose to each other, and curing a pair of the substrates 114 and 115 by a thermosetting adhesive printed in the surrounding of the display area.

Then, the liquid crystal 116 is formed by filling a liquid crystal material (BL035, Δn=0.267 and made by Merck KGaA) in the gap between the substrates 114 and 115 using a vacuum injection method. By so doing, the liquid crystal 116 portion of the switching retarder 8 using the homogeneous liquid crystal element has a phase difference value corresponding to the ½ wavelength based on 550 nm. Hence, by inducing the change of the orientation of the liquid crystal 116 per polarizing area, the switching retarder 8 using the homogeneous liquid crystal element functions to switch between two states, i.e., a state where there is no phase difference and the state of the ½ wave plate where the phase difference is the ½ wavelength. Next, the switching retarder 8 using the homogeneous liquid crystal element is positioned to correspond to the pixels of the above liquid crystal display 3 for displaying pixels. Then, the switching retarder 8 is adhered by means of the adhesive 101.

Further, a manufacturing method and configuration using a ferroelectric liquid crystal element will be described as the third configuration example of the switching retarder 8 according to the present embodiment.

To manufacture the switching retarder 8 using a ferroelectric liquid crystal element, the substrates 114 and 115 formed with glass cloth reinforced transparent films are first prepared. Further, the black stripes 122 patterned in a belt shape are formed on the substrate 115 on the front surface side as described above. Next, transparent conductive layers (for example, ITO films) having the thicknesses of 100 nm to 140 nm are formed in the solid state on the entire substrates 114 and 115 as the transparent electrodes 119 and 120 using the sputtering method.

Then, the photo-alignment oriented films 117 and 118 having the thicknesses of 30 nm are formed on the transparent electrodes 119 and 120 using the spin coating method such that liquid crystal is horizontally oriented, and photo-aligning technique is applied to these oriented films 117 and 118 to form horizontally oriented films. In this case, to correspond to the first polarizing areas 31 and the second polarizing areas 32 of the switching retarder 8 using the ferroelectric liquid crystal element, photo-aligning processing is applied according to a condition set per polarizing area such that the orientation directions of the liquid crystal 116 realized when the voltage is applied to the liquid crystal 116 become different.

Next, a pair of the substrates 114 and 115 is adhered such that a cell gap which is an inter-substrate distance therebetween is 3 μl. More specifically, both the substrates are fixed by coating plastic spacers (not illustrated) on one substrate, arranging a pair of the substrates 114 and 115 to oppose to each other, and curing a pair of the substrates 114 and 115 by a thermosetting adhesive printed in the surrounding of the display area.

Then, the liquid crystal 116 is formed by filling a ferroelectric liquid crystal material (Δn=0.25 and cone angle 45 degrees) in the gap between the substrates 114 and 115 using the vacuum injection method. In addition, assuming that the liquid crystal modulation factor is about 70%, Δn of the liquid crystal and the cell gap are selected such that the phase difference of the liquid crystal 116 has the ½ wavelength at this modulation factor.

By so doing, when the voltage is applied to the transparent electrodes 119 and 120 and the voltage is applied uniformly to the plane of the liquid crystal 116, the optical axis of the liquid crystal 116 of the first polarizing areas 31 is in the horizontal direction or in the direction of the upper left at 45 degrees (the upper left at 45 degrees in the drawings) from the horizontal direction when the viewer 50 looks at the stereoscopic image display apparatus 1. Further, the second polarizing areas 32 have a different state from the first polarizing areas, and the optical axis is in the direction of the upper left at 45 degrees (the upper left at 45 degrees in the drawings) from the horizontal direction, or in the horizontal direction.

Further, when the voltage of a different polarity is applied to the transparent electrodes 119 and 120 and the voltage is applied uniformly to the plane of the liquid crystal 116, the optical axis of the liquid crystal 116 of the first polarizing areas 31 is in the direction of the upper left at 45 degrees (the upper left at 45 degrees in the drawings) from the horizontal direction, or in the horizontal direction when the viewer 50 looks at the stereoscopic image display apparatus 1. Further, the second polarizing areas 32 have a different state from the first polarizing areas, and the optical axis of the liquid crystal 116 is in the horizontal direction or in the direction of the upper left at 45 degrees (the upper left at 45 degrees in the drawings) from the horizontal direction.

That is, when the voltages of different polarities are applied to the first polarizing areas 31 and the second polarizing areas 32 of the switching retarder 8 using the ferroelectric liquid crystal element, the first polarizing areas 31 and the second polarizing areas 32 are respectively switched between the horizontal direction and the direction of the upper left at 45 degrees. Further, in this case, the first polarizing areas 31 and the second polarizing areas 32 are configured such that the optical axes of the liquid crystal 116 are shifted at 45 degrees.

Next, the switching retarder 8 using the ferroelectric liquid crystal element is positioned to correspond to the pixels of the above liquid crystal display 3 for displaying pixels. Then, the switching retarder 8 adhered by means of the adhesive 101.

In addition, although the entire surface of the structure of the transparent electrodes 119 and 120 is solid in the above example, it is also possible to pattern and use the transparent electrodes 119 and 120 similar to the switching retarder 8 using the above TN liquid crystal element. In this case, it is also possible to pattern the transparent electrodes 119 and 120 in a stripe shape to correspond to the first polarizing areas 31 and the second polarizing areas 32 of the switching retarder 8 using the ferroelectric liquid crystal element. By so doing, it is possible to induce a change of an orientation of the liquid crystal 116 at arbitrary portions of the first polarizing areas 31 and the second polarizing areas 32. That is, it is possible not only to induce a change of an orientation of the liquid crystal 116 entirely all at once, but also to sequentially induce a change of an orientation of the liquid crystal 116 at arbitrary portions in an arbitrary order.

Although specific configuration examples of the switching retarder 8 have been described above, if the transparent electrodes 119 and 120 of the switching retarder 8 are patterned, the liquid crystal element desirably adopts a different structure from a structure in the case where a liquid crystal element is used as a display element as in conventional cases.

FIG. 5(*a*) is a view schematically illustrating an electrode structure of a conventional passive driving liquid crystal display element, and FIG. 5(*b*) is a view schematically illustrating an electrode structure of the switching retarder 8 according to the present embodiment.

As illustrated in FIG. 5(*a*), in a conventional passive driving liquid crystal display element 300, upper electrodes 302 and lower electrodes 301 are respectively patterned in a stripe pattern, and disposed in a matrix pattern to be orthogonal to each other.

By contrast with this, as illustrated in FIG. 5(*b*), in the switching retarder 8 according to the present embodiment, when passive driving is performed, the upper transparent electrodes 120 and the lower transparent electrodes 119 are respectively patterned in a stripe pattern and are preferably parallel without being disposed in a matrix pattern.

In addition, it is possible to pattern the transparent electrodes 119 and 120 by determining the sizes thereof according to the sizes and positional relationship of the first image forming areas 21 and the second image forming areas 22 of the liquid crystal panel 6. That is, in the liquid crystal panel 6, a desired number of horizontal lines 23 are bound as one set to form the first image forming areas 21 and the second image forming areas 22. Further, in the switching retarder 8, it is possible to pattern the transparent electrodes 119 and 120 to appropriate sizes to correspond to the positions and sizes of the first image forming areas 21 and the second image forming areas 22, and form the first polarizing areas 31 and the second polarizing areas 32 in the switching retarder 8.

Further, it is also possible to pattern the transparent electrodes 119 and 120 similar to the liquid crystal panel 6 by determining the sizes and positional relationship to correspond to each of the horizontal lines 23 of the liquid crystal panel 6. Further, while a desired number of horizontal lines 23 are bound as one set in the liquid crystal panel 6, it is possible to form the sets of the same configuration in the transparent electrodes 119 and 120. As a result, it is possible to form the first polarizing areas 31 and the second polarizing areas 32 of the switching retarder 8 with corresponding sets of transparent electrodes 119 and sets of transparent electrodes 120. Further, it is possible to induce the same change of the orientation of the liquid crystal 116 per area of the first polarizing areas 31 and the second polarizing areas 32. That is, by performing switching in the switching retarder 8, it is possible to realize orientation states of the liquid crystal different from the previous states in the first polarizing areas 31 and the second polarizing areas 32.

Further, it is possible to form the switching retarder 8 according to the present embodiment using the active driving liquid crystal element.

Figure 6A:
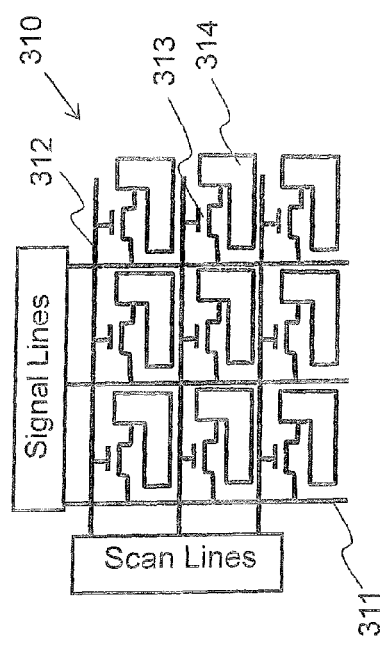
FIG. 6 is a view schematically illustrating a configuration of a conventional active driving liquid crystal element and a view schematically illustrating a configuration of a main part of the switching retarder.
Figure 6B:
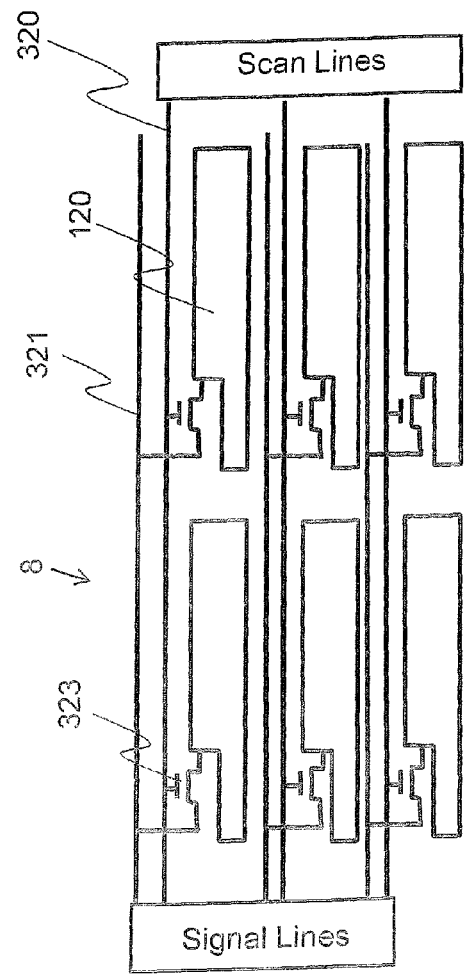

FIG. 6(a) is a view schematically illustrating a configuration of a conventional active driving liquid crystal element 310, and FIG. 6(b) is a view schematically illustrating a configuration of a main part of the switching retarder 8 according to the present embodiment using the active driving liquid crystal element.

As illustrated in FIG. 6(a), in the conventional active driving liquid crystal element 310, scan lines 312 and signal lines 311 are disposed in a matrix pattern to be orthogonal to each other, and at their intersections, active elements 313 are provided and pixel electrodes 314 are arranged.

By contrast with this, as illustrated in FIG. 6(b), if the switching retarder 8 according to the present embodiment is formed using the active driving liquid crystal element, the scan lines 320 and the signal lines 321 are disposed to be parallel. Further, the pixel electrode which is the upper transparent electrode 120 adopts a horizontally-long structure which can drive the liquid crystal 116 by means of the active element 323 of the pixel electrode, and has the maximum width.

Further, when the active element 323 and the transparent electrode 120 are formed, it is possible to pattern the transparent electrode 120 by determining the size thereof according to the sizes and positional relationship of the first image forming area 21 and the second image forming area 22 of the liquid crystal panel 6, and provide the active element 323. That is, a desired number of horizontal lines 23 are bound as one set in the liquid crystal panel 6 to form the first image forming areas 21 and the second image forming areas 22. Further, in the switching retarder 8, it is possible to form the transparent electrodes 120 and the active elements 323 of appropriate sizes to correspond to the positions and sizes of the first image forming areas 21 and the second image forming areas 22, and form the first polarizing areas 31 and the second polarizing areas 32 of the switching retarder 8.

Further, when the active element 323 and the transparent electrode 120 are formed, it is possible to pattern the transparent electrode 120 by determining the sizes and positional relationship of the transparent electrode 120 to correspond to each of all horizontal lines 23 of the liquid crystal panel 6, and provide the active element for each transparent electrode 120. In this case, according to selection of the number of horizontal lines 23 to be bound as one set in the liquid crystal panel 6, a predetermined number of combinations of the active elements 323 and the transparent electrodes 120 are bound as one set. Further, it is possible to form the first polarizing areas 31 and the second polarizing areas 32 of the switching retarder 8 with these sets. Further, by driving each set in the same manner and inducing the same change of an orientation state of the liquid crystal 116, switching is performed in the switching retarder 8. As a result, it is possible to realize the orientation states of the liquid crystal different from the previous states in the first polarizing areas 31 and the second polarizing areas 32.

The main configuration of the stereoscopic image display apparatus 1 according to the present embodiment has been described above. Next, a method will be described which makes the viewer 50 recognize stereoscopic images based on right eye image light and left eye image light using the stereoscopic image display apparatus 1 according to the present embodiment.

FIGS. 7(a) and (b) are views describing a method of making the viewer 50 recognize stereoscopic images using the stereoscopic image display apparatus 1 according to the present embodiment. Further, FIG. 7(a) is a view describing a method of making the viewer 50 recognize one frame image, and FIG. 7(b) is a view describing a method of making the viewer 50 recognize a frame image after image display areas are replaced following switching of a frame.

When the viewer 50 views stereoscopic images using the stereoscopic image display apparatus 1, if one frame image is displayed, a right eye image and a left eye image are first respectively formed as described above in the first image forming areas 21 and the second image forming areas 22 of the liquid crystal panel 6.

Further, as indicated by the arrow in FIG. 7(a), right eye image light transmitted through the first image forming areas 21 and left eye image light transmitted through the second image forming areas 22 transmit through the polarizing plate 7, and become linear polarized lights having polarizing axes in a direction vertical to the horizontal direction.

Then, the right eye image light and the left eye image light are incident on the switching retarder 8. In this case, in the first polarizing areas 31 of the liquid crystal 116, the switching retarder 8 allows linear polarized light incident from the polarizing plate 7 to be incident on the phase difference film 121. Further, in the second polarizing areas 32, linear polarized light is converted to have a polarizing axis in a direction parallel to the horizontal direction and be incident on the phase difference film 121.

Hence, as indicated by the arrow in FIG. 7(a), in the first polarizing areas 31 of the switching retarder 8 on which right eye image light is incident, this incident right eye image light is emitted as counterclockwise circular polarized light. Further, as indicated by the arrow in FIG. 7(a), in the second polarizing areas 32, incident left eye image light is emitted as clockwise circular polarized light.

Next, the right eye image light and the left eye image light obtained in this way are incident on the polarized glasses 10 which the viewer 50 wears. As illustrated in FIGS. 4(*a*) and 4(*b*), the polarized glasses 10 have the right eye glass 41 and the left eye glass 42.

In this case, with the polarized glasses 10, light transmits through the ¼ wave plate 43*a* provided in the right eye glass 41, is converted into linear polarized light parallel to the horizontal direction and reaches the right eye of the viewer 50.

By contrast with this, when right eye image light which is counterclockwise circular polarized light is incident on the left eye glass 42, as indicated by the arrow in FIG. 7(*a*), the right eye image light transmits through the ¼ wave plate 43*b* provided in the left eye glass 42 and is converted into linear polarized light vertical to the horizontal direction. Further, although the right eye image light is incident on the polarizing plate 45*b*, the right eye image light cannot transmit through and is blocked by the polarizing plate 45*b* and does not reach the left eye of the viewer 50.

Further, the left eye image light which is clockwise circular polarized light transmits through the ¼ wave plate 43*b* provided in the left eye glass 42, is converted into linear polarized light parallel to the horizontal direction, and reaches the left eye of the viewer 50.

By contrast with this, when left eye image light which is clockwise circular polarized light is incident on the right eye glass 41, the left eye image light transmits through the ¼ wave plate 43*a* provided in the right eye glass 41 and is converted into linear polarized light vertical to the horizontal direction. Further, although the left eye image light is incident on the polarizing plate 45*a*, the left eye image light cannot transmit through and is blocked by the polarizing plate 45*a*, and does not reach the right eye of the viewer 50.

Thus, when the viewer 50 views the stereoscopic image display apparatus 1 wearing the polarized glasses 10 as described above in the range where right eye image light and left eye image light transmitted through the first polarizing areas 31 and the second polarizing areas 32 of the switching retarder 8 are emitted, the right eye can view only right eye image light and the left eye can view only left eye image light. Consequently, the viewer 50 can recognize these right eye image light and left eye image light as stereoscopic images.

Next, a case will be described where, as illustrated in FIG. 7(*b*), when the viewer 50 views a stereoscopic image using the stereoscopic image display apparatus 1, image forming areas are replaced following switching of a frame as described above. That is, a case will be described where a left eye image and a right eye image are formed respectively on the first image forming areas 21 and the second image forming areas 22 in the liquid crystal panel 6 after switching of a frame.

In this case, following replacement of image forming areas following switching of a frame, phase difference states of the first polarizing areas 31 and the second polarizing areas 32 are switched in the switching retarder 8. More specifically, the phase difference state of the first polarizing areas 31 switches to the same phase difference state of the second polarizing areas 32 before switching of a frame. Further, the phase difference state of the second polarizing areas 32 switches to the same phase difference state as the phase difference state of the first polarizing areas 31 before switching of a frame.

Hence, similar to the above case, left eye image light transmitted through the first image forming areas 21 in the liquid crystal panel 6 and right eye image light transmitted through the second image forming areas 22 transmit through the polarizing plate 7 as indicated by the arrow in FIG. 7(*b*), and become linear polarized lights respectively having polarizing axes vertical to the horizontal direction.

Further, although left eye image light and right eye image light are incident on the switching retarder 8, the left eye image light is incident on the first polarizing areas 31 of the switching retarder 8. Furthermore, as indicated by the arrow in FIG. 7(*b*), this incident left eye image light is emitted as clockwise circular polarized light. Still further, in the second polarizing areas 32, incident right eye image light is emitted as counterclockwise circular polarized light.

Next, the left eye image light and the right eye image light obtained in this way are incident respectively on the polarized glasses 10 which the viewer 50 wears.

As a result, with the polarized glasses 10, when left eye image light which is clockwise circular polarized light is incident on the right eye glass 41, as indicated by the arrow in FIG. 7(*b*), the left eye image light transmits through the ¼ wave plate 43*a* provided in the right eye glass 41 and is converted into linear polarized light vertical to the horizontal direction, is incident on, but cannot transmit through and is blocked by the polarizing plate 45*a* and therefore does not reach the right eye of the viewer 50.

By contrast with this, left eye image light which is clockwise circular polarized light is incident on the left eye glass 42 and transmits through the ¼ wave plate 43*b* provided in the left eye glass 42, is converted into linear polarized light parallel to the horizontal direction as indicated by the arrow in FIG. 7(*b*), transmits through the polarizing plate 45*b* as is and reaches the left eye of the viewer 50.

Further, as indicated by the arrow in FIG. 7(*b*), right eye image light which is counterclockwise circular polarized light transmits through the ¼ wave plate 43*a* provided in the right eye glass 41, is converted into linear polarized light parallel to the horizontal direction, transmits through the polarizing plate 45*a* as is and reaches the right eye of the viewer 50.

By contrast with this, when right eye image light which is counterclockwise circular polarized light is incident on the left eye glass 42, as indicated by the arrow in FIG. 7(*b*), the right eye image light transmits through the ¼ wave plate 43*b* provided in the left eye glass 42, is converted into linear polarized light vertical to the horizontal direction, is incident on, but cannot transmit through and is blocked by the polarizing plate 45*b* and therefore does not reach the left eye of the viewer 50.

Thus, the stereoscopic image display apparatus 1 is viewed wearing the polarized glasses 10 within a range where left eye image light and right eye image light transmitted through the first polarizing areas 31 and the second polarizing areas 32 of the switching retarder 8 are emitted, so that, even if image forming areas to form right eye and left eye images are replaced following switching of a frame, the right eye can view only the right eye image light. Further, the left eye can view only the left eye image light. Consequently, the viewer 50 can recognize these right eye image light and left eye image light as stereoscopic images at all times.

Accordingly, with a conventional stereoscopic image display apparatus, image forming areas to form right eye and left eye images are fixed, and therefore the vertical resolution is, for example, decreased by half and the resolution is thereby reduced. On the other hand, the stereoscopic image display apparatus 1 according to the present embodiment enables display at the full resolution which fully exercises performance of the liquid crystal display 3 without decreasing the resolution at all.

Further, with a conventional stereoscopic image display apparatus, there are cases where only one of left eye and right eye images are displayed at all times, and there is a time lag to recognize the three dimensions. On the other hand, the stereoscopic image display apparatus 1 according to the present embodiment displays left eye and right eye images at all times and, consequently, can reduce fatigue of the viewer. Further, the stereoscopic image display apparatus 1 also provides the effect of preventing a sense of difference in the stereoscopic view from being produced by misalignment of left and right images which occurs when stereoscopic images are fast moving.

Although the method has been described above which makes the viewer 50 recognize stereoscopic images using the stereoscopic image display apparatus 1 according to the present embodiment, the more detailed function of the switching retarder 8 in this case will be described based on the above specific example. In addition, each specific example will be described by assigning the same reference numerals to common members for ease of description. The same applies below.

FIGS. 8(*a*) and (*b*) are views describing the configuration and function of the switching retarder 8 using a TN liquid crystal element according to the first example of the switching retarder 8 of the present embodiment. Further, FIG. 8(*a*) illustrates the function of the switching retarder 8 when one frame image is formed, and FIG. 8(*b*) illustrates the function of the switching retarder 8 when one frame is formed resulting from replacement of image forming areas following switching of a frame.

In the switching retarder 8 using the TN liquid crystal element according to the first example of the switching retarder 8, the transparent electrodes 119 and 120 are patterned to correspond to the first image forming areas 21 and the second image forming areas 22 of the liquid crystal panel 6, and the first polarizing areas 31 and the second polarizing areas 32. Consequently, it is possible to select the on state and select the off state of the liquid crystal upon application of the voltage, independently in the first polarizing areas 31 and the second polarizing areas 32, and independently change the orientation of the liquid crystal.

Consequently, as illustrated in FIG. 8(*a*), when linear polarized light 201 from the polarizing plate 7 of the liquid crystal display 3 is incident on the switching retarder 8 using the TN liquid crystal element, it is possible to place the liquid crystal 116 of the first polarizing areas 31 of the switching retarder 8 in the on state, and induce a change of the orientation of the liquid crystal. Further, it is possible to place the liquid crystal 116 of the second polarizing areas 32 in the off state without applying the voltage to the liquid crystal 116, and maintain the initial orientation state (90 degree twisted orientation) of the liquid crystal.

As a result, the linear polarized light 201 transmits through the first polarizing areas 31 as is without optical rotation, and is incident on the phase difference film 121 as linear polarized light 202.

Further, the linear polarized light 201 is converted into linear polarized light 203 having the rotated optical axis parallel to the horizontal direction in the second polarizing areas 32 having optical rotation, and is incident on the phase difference film 121.

Further, the function of the phase difference film 121 which is a ¼ wave plate converts the linear polarized light 202 and the linear polarized light 203 respectively into counterclockwise circular polarized light 204 and clockwise circular polarized light 205.

Next, as illustrated in FIG. 8(*b*), when linear polarized light 206 from the polarizing plate 7 of the liquid crystal display 3 is incident on the switching retarder 8 using the TN liquid crystal element, the liquid crystal 116 of the first polarizing areas 31 of the switching retarder 8 is placed in the off state without having the voltage applied, and maintains the initial orientation state of the liquid crystal. Further, in the second polarizing areas 32, the liquid crystal 116 is placed in the on state by having the voltage applied, and induces a change of the orientation of the liquid crystal.

As a result, the linear polarized light 206 is converted into linear polarized light 207 having the rotated optical axis parallel to the horizontal direction in the first polarizing areas 31 having optical rotation, and is incident on the phase difference film 121.

Further, the linear polarized light 206 transmits through the second polarizing area 32 as is without optical rotation, and is incident on the phase difference film 121 as linear polarized light 208.

Further, the function of the phase difference film 121 which is a ¼ wave plate converts the linear polarized light 207 and the linear polarized light 208 respectively into clockwise circular polarized light 209 and counterclockwise circular polarized light 210.

Next, a configuration and function of the switching retarder 8 using the homogeneous liquid crystal element according to the second example of the switching retarder 8 of the present embodiment will be described.

FIGS. 9(*a*) and (*b*) are views describing the configuration and function of the switching retarder 8 using the homogeneous liquid crystal element according to the second example of the switching retarder 8 of the present embodiment. Further, FIG. 9(*a*) illustrates the function of the switching retarder 8 when one frame image is formed, and FIG. 9(*b*) illustrates the function of the switching retarder 8 when a frame image is formed resulting from replacement of image display areas following switching of a frame.

In the switching retarder 8 using the homogeneous liquid crystal element, the transparent electrodes 119 and 120 are patterned to correspond to the first image forming areas 21 and the second image forming areas 22 respectively in the liquid crystal panel 6, and the first polarizing areas 31 and the second polarizing areas 32. Consequently, it is possible to select the on state and select the off state of the liquid crystal upon application of the voltage, independently in the first polarizing areas 31 and the second polarizing areas 32, and independently change the orientation of the liquid crystal.

Consequently, as illustrated in FIG. 9(*a*), when linear polarized light 211 from the polarizing plate 7 of the liquid crystal display 3 is incident on the switching retarder 8 using the homogeneous liquid crystal element, it is possible to place the liquid crystal 116 of the first polarizing areas 31 of the switching retarder 8 in the on state, and induce a change of the orientation of the liquid crystal. Further, it is possible to place the liquid crystal 116 of the second polarizing areas 32 in the off state without having the voltage applied, and maintain the initial orientation state of the liquid crystal.

In addition, in this case, the switching retarder 8 using the homogeneous liquid crystal element functions to switch and select between two states, i.e., a state where there is no phase difference and a state where the phase difference is a ½ wavelength. That is, the switching retarder 8 using the homogeneous liquid crystal element can select an area in which there is no phase difference per polarizing area of the first polarizing areas 31 and the second polarizing areas 32, and an area which functions as a ½ wave plate. Further, the initial orientation state of the liquid crystal 116 is a parallel orientation. In addition, the orientation direction is a direction of an arrow shown in the second polarizing area 32 illustrated in FIG. 9(*a*), and is a direction of an arrow shown in the first polarizing area 31 illustrated in FIG. 9(*b*). That is, the orientation direction is in the direction of the upper left at 45 degrees (the upper left at 45 degrees in the drawings) from the horizontal direction. Hence, the second polarizing area 32 in FIG. 9(*a*) and the first polarizing area 31 in FIG. 9(*b*) having the liquid crystal 116 in the off state function as a ½ wave plate having the optical axis in the direction of the upper left at 45 degrees.

As a result, the linear polarized light 211 transmits through the first polarizing areas 31 in which there is no the phase difference as is, and is incident on the phase difference film 121 as linear polarized light 212.

Further, the linear polarized light 211 is converted into linear polarized light 213 having the rotated optical axis parallel to the horizontal direction in the second polarizing areas 32 in which the phase difference is the ½ wavelength, and is incident on the phase difference film 121.

Further, the function of the phase difference film 121 which is a ¼ wave plate converts the linear polarized light 212 and the linear polarized light 213 respectively into counterclockwise circular polarized light 214 and clockwise circular polarized light 215.

Next, as illustrated in FIG. 9(*b*), when linear polarized light 216 from the polarizing plate 7 of the liquid crystal display 3 is incident on the switching retarder 8 using the homogeneous liquid crystal element, the liquid crystal 116 of the first polarizing areas 31 of the switching retarder 8 is placed in the off state without having the voltage applied, and maintains the initial orientation state of the liquid crystal. Further, in the second polarizing areas 32, the liquid crystal 116 is placed in the on state by having the voltage applied to induce a change of the orientation of the liquid crystal.

As a result, the linear polarized light 216 is converted into linear polarized light 217 having the rotated optical axis parallel to the horizontal direction in the first polarizing areas 31 in which there is a phase difference, and is incident on the phase difference film 121. Further, the linear polarized light 216 transmits through the second polarizing areas 32 in which there is no phase difference as is, and is incident on the phase difference film 121 as linear polarized light 218.

Furthermore, the function of the phase difference film 121 which is a ¼ wave plate converts the linear polarized light 217 and the linear polarized light 218 respectively into clockwise circular polarized light 219 and counterclockwise circular polarized light 220.

Next, a configuration and function of the switching retarder 8 using the ferroelectric liquid crystal element according to the third example of the switching retarder 8 of the present embodiment will be described.

Figure 10A:
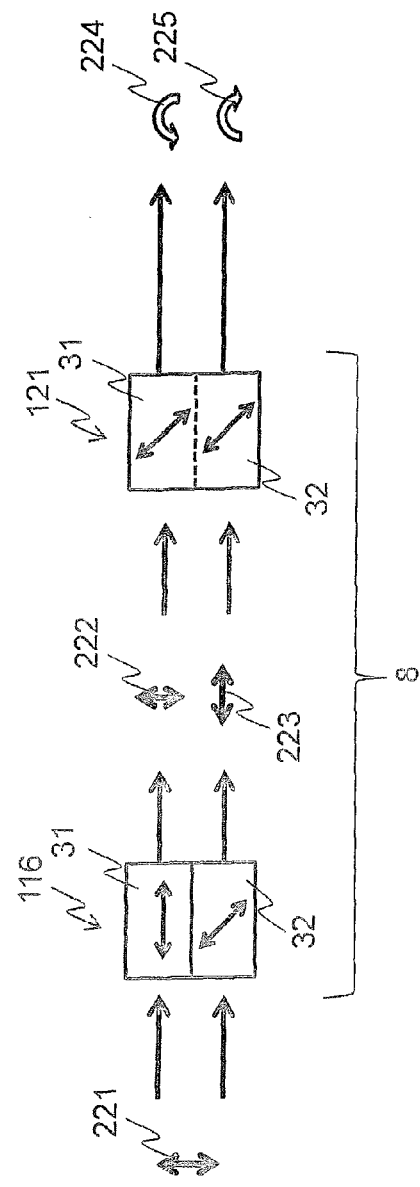
FIG. 10 illustrates the function of the switching retarder when one frame image is formed, and illustrates the function of the switching retarder when a frame image is formed following replacement of image display areas following switching of a frame.
Figure 10B:
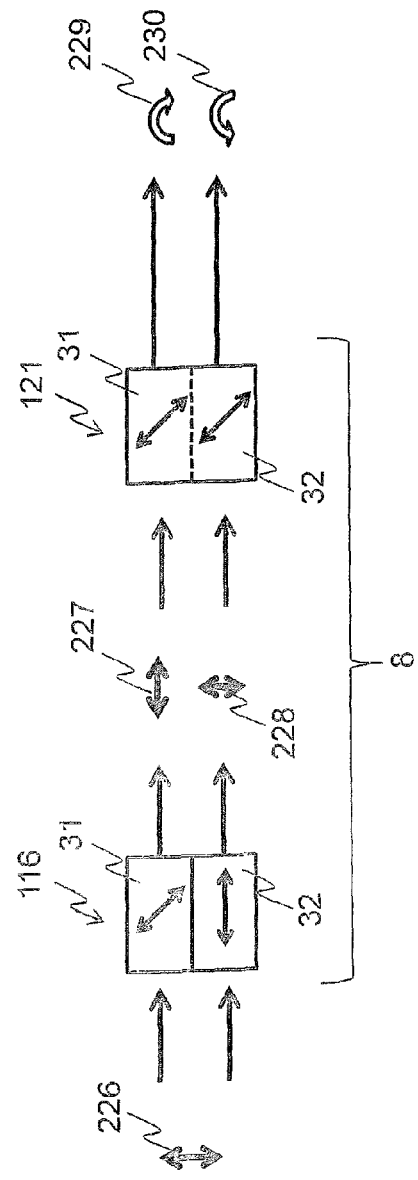

FIGS. 10(*a*) and (*b*) are views describing the configuration and function of the switching retarder 8 using the ferroelectric liquid crystal element according to the third example of the switching retarder 8 according to the present embodiment. Further, FIG. 10(*a*) illustrates the function of the switching retarder 8 when one frame image is formed, and FIG. 10(*b*) illustrates the function of the switching retarder 8 when a frame image is formed following replacement of image display areas following switching of a frame. The switching retarder 8 using the ferroelectric liquid crystal element uses two stable liquid crystal orientation states which can be selected by applying the voltage of a different polarity.

In the switching retarder 8 using the ferroelectric liquid crystal element, the first polarizing areas 31 and the second polarizing areas 32 are provided to correspond to the first image forming areas 21 and the second image forming areas 22 respectively in the liquid crystal panel 6. Further, in the first polarizing areas 31 and the second polarizing areas 32, orientation processing is applied to the oriented films 117 and 118 such that the liquid crystal 116 has an orientation state of a different direction when the voltage is applied.

Consequently, as illustrated in FIG. 10(*a*), when the linear polarized light 221 from the polarizing plate 7 of the liquid crystal display 3 is incident on the switching retarder 8, it is possible to induce a change of the orientation of the liquid crystal by simultaneously applying the voltage to the liquid crystal 116 of the first polarizing areas 31 and the second polarizing areas 32 of the switching retarder 8 using the ferroelectric liquid crystal element. Further, it is possible to change the orientation to the orientation state of a different direction. Further, when the voltage is applied, the first polarizing areas 31 and the second polarizing areas 32 function as different ½ wave plates having optical axes of different directions. In this case, the orientation direction of the liquid crystal 116 upon application of the voltage is the horizontal direction in the first polarizing areas 31 when the viewer 50 looks at the stereoscopic image display apparatus 1. By contrast with this, in the second polarizing areas 32, the orientation direction is in the direction of the upper left at 45 degrees (the upper left at 45 degrees in the drawings) when the viewer 50 looks at the stereoscopic image display apparatus 1.

Hence, when the voltage is applied to the liquid crystal 116, the first polarizing areas 31 function as a ½ wave plate having the optical axis in the horizontal direction. By contrast with this, the second polarizing areas 32 function as a ½ wave plate having the optical axis in the direction of the upper left at 45 degrees (the upper left at 45 degrees in the drawings) from the horizontal direction.

As a result, the linear polarized light 221 transmits through the first polarizing areas 31 as is, and is incident on the phase difference film 121 as linear polarized light 222.

Further, in the second polarizing areas 32 which have the optical axis in the direction of the upper left at 45 degrees from the horizontal direction and in which the phase difference is the ½ wavelength, the linear polarized light 221 is converted into linear polarized light 223 having the rotated optical axis parallel to the horizontal direction, and is incident on the phase difference film 121.

Furthermore, the function of the phase difference film 121 which is the ¼ wave plate converts the linear polarized light 222 and the linear polarized light 223 respectively into counterclockwise circular polarized light 224 and clockwise circular polarized light 225.

Next, as illustrated in FIG. 10(*b*), when the linear polarized light 226 from the polarizing plate 7 of the liquid crystal display 3 is incident on the switching retarder 8 using the ferroelectric liquid crystal element, it is possible to induce a change of the orientation of the liquid crystal 116 of the first polarizing areas 31 and the second polarizing areas 32 of the switching retarder 8 by simultaneously applying the voltage of a polarity different from above, and set the orientation state of a direction different from above.

As a result, in the first polarizing areas 31, the orientation direction of the liquid crystal 116 upon application of the voltage is in the direction of the upper left at 45 degrees (the upper left at 45 degrees in the drawings) when the viewer 50 looks at the stereoscopic image display apparatus 1. By contrast with this, in the second polarizing areas 32, the orientation direction is the horizontal direction when the viewer 50 looks at the stereoscopic image display apparatus 1.

Consequently, when the voltage is applied to the liquid crystal 116, the first polarizing areas 31 function as the ½ wave plate having the optical axis in the direction of the upper left at 45 degrees (the upper left at 45 degrees in the drawings) from the horizontal direction. By contrast with this, the second polarizing areas 32 function as the ½ wave plate having the optical axis in the horizontal direction.

As a result, in the first polarizing areas 31 which have the optical axis in the direction of the upper left at 45 degrees from the horizontal direction and in which the phase difference is a ½ wavelength, the linear polarized light 226 is converted into linear polarized light 227 having the rotated optical axis parallel to the horizontal direction, and is incident on the phase difference film 121. By contrast with this, the linear polarized light 226 transmits through the second polarizing areas 32 as is, and is incident on the phase difference film 121 as linear polarized light 228.

Further, the function of the phase difference film 121 which is a ¼ wave plate converts the linear polarized light 227 and the linear polarized light 228 respectively into clockwise circular polarized light 229 and counterclockwise circular polarized light 230.

In addition, the above switching retarder 8 using the ferroelectric liquid crystal element employs, for example, a configuration in which the transparent electrodes 119 and 120 to be used have an entirely solid plate shape without being patterned, and in which the voltage is applied to the entire liquid crystal. However, it is also possible to pattern the transparent electrodes 119 and 120 similar to the switching retarder 8 using the above TN liquid crystal element. Further, instead of applying the voltage uniformly to the entire liquid crystal and temporarily inducing a change of the orientation of the liquid crystal 116, it is also possible to sequentially apply the voltage to the first polarizing areas 31 and the second polarizing areas 32 respectively in the liquid crystal 116, and sequentially select the orientation state in the liquid crystal 116.

Next, the operation of the stereoscopic image display apparatus 1 according to the present embodiment will be described.

As described above, to display stereoscopic images, the stereoscopic image display apparatus 1 according to the present embodiment simultaneously displays a right eye image and a left eye image on one frame image. Further, the stereoscopic image display apparatus 1 adopts a scheme of sorting images to the left and right eyes of the viewer 50 using the switching retarder 8 of the above optical unit and displaying stereoscopic images. In this case, it is effective to first divide all horizontal scan lines continuously aligned in the vertical direction of the display screen, into the first image forming areas 21 and the second image forming areas 22 each formed with a plurality of horizontal lines 23 in order to display all pieces of image information.

Further, simultaneously, the first image forming areas 21 display one of either a right eye image and a left eye image and the second image forming areas 22 display the other image. Furthermore, image forming areas for displaying the left eye image and the right eye image are replaced at a predetermined cycle appropriately following switching of a frame. Still further, at the same time as the image forming areas are replaced, the phase difference states are switched between the first polarizing areas 31 and the second polarizing areas 32 of the switching retarder 8. Using this method is effective to display all pieces of video information and allow the viewer 50 to enjoy stereoscopic images.

Figure 11:
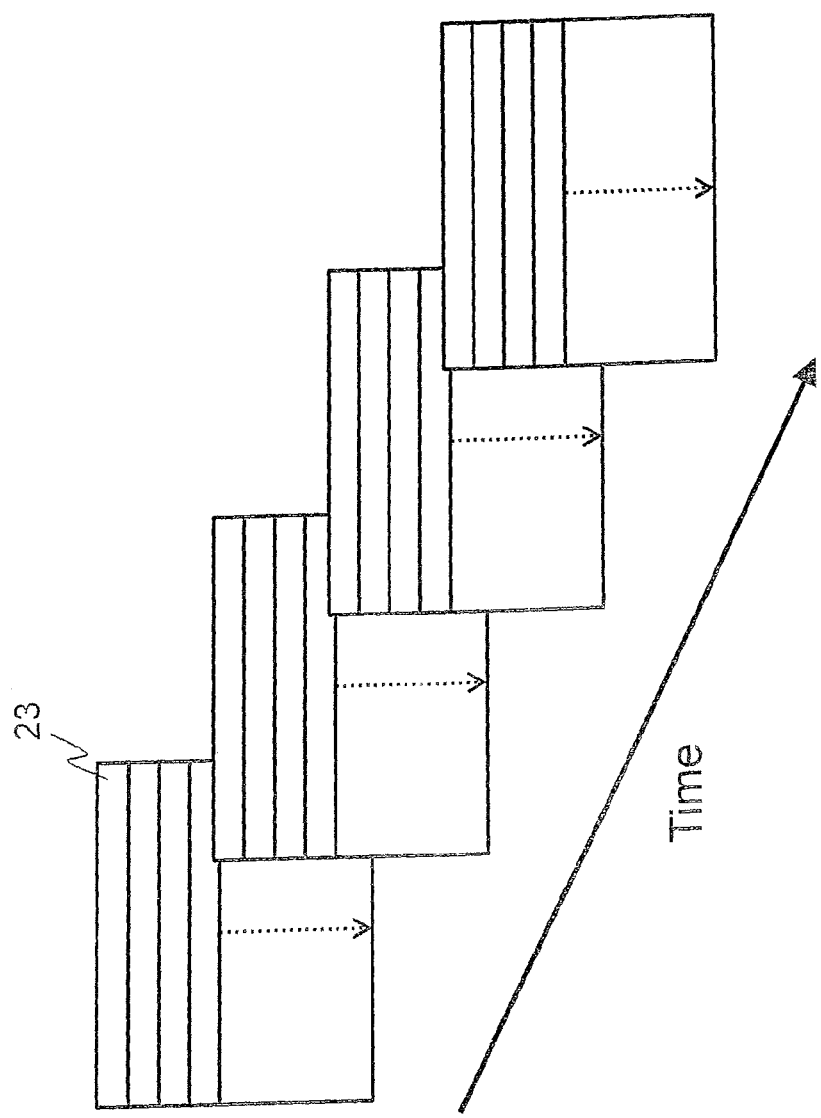
FIG. 11 is a view describing a display method of a common liquid crystal display.

However, when the above liquid crystal display 3 is used in the stereoscopic image display apparatus 1, as illustrated in FIG. 11, information of a frame image is updated by sequentially overwriting and updating the screen from the horizontal line 23 at the top of the screen to the horizontal line 23 at the bottom. Therefore, the viewer 50 simultaneously views a previous image and the next new image at all times. As a result, the stereoscopic image display apparatus 1 has a problem that crosstalk in which the viewer 50 views with the left eye an image which needs to be viewed with the right eye, frequently occurs and the viewer 50 has difficulty in recognizing stereoscopic images. FIG. 11 is a view describing a display method of a common liquid crystal display.

In regard to this problem, with the first operation method example, the stereoscopic image display apparatus 1 according to the present embodiment can introduce a flashing operation of the backlight 2 to reduce the crosstalk caused when information of the frame image is updated.

Figure 12:
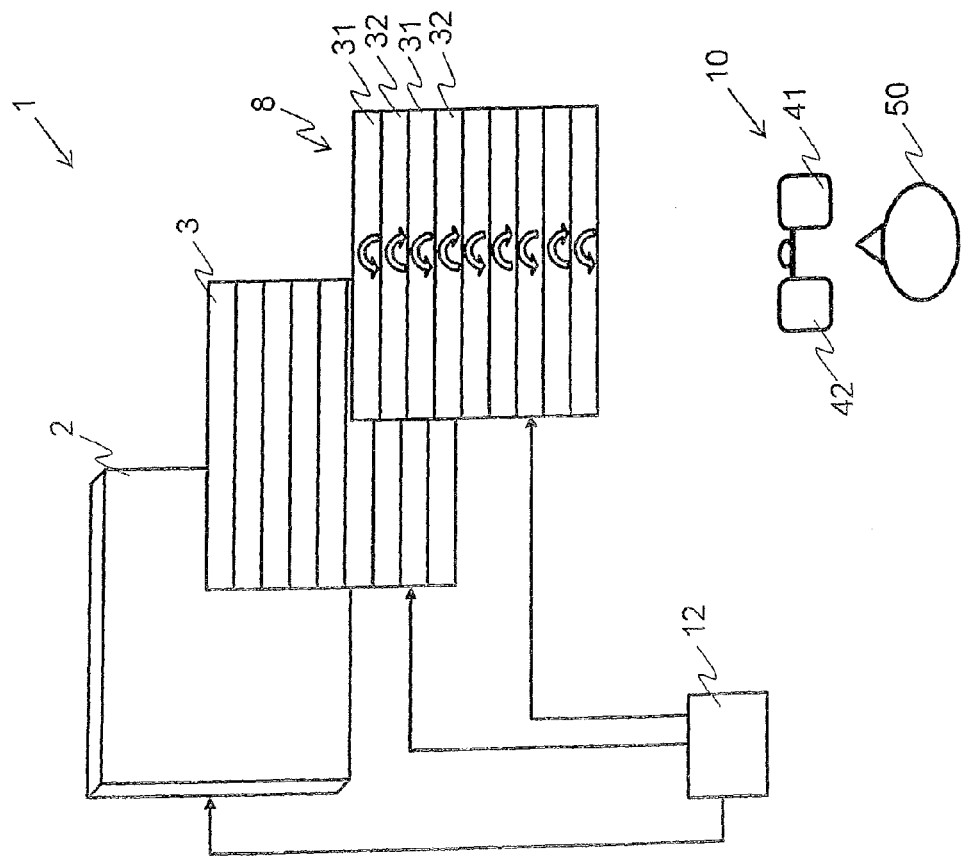
FIG. 12 is a view describing the first operation method of the stereoscopic image display apparatus according to the present embodiment.

FIG. 12 is a view describing the first operation method of the stereoscopic image display apparatus 1 according to the present embodiment.

As described above, the stereoscopic image display apparatus 1 according to the present embodiment has the backlight 2, the liquid crystal display 3 and the retarder 8 of the optical unit in this order, and further has the controlling apparatus 12, and these are accommodated in the housing (not illustrated). Further, the stereoscopic image display apparatus 1 has the polarized glasses 10 which the viewer 50 uses to view stereoscopic images.

The controlling apparatus 12 commands the liquid crystal display 3 to simultaneously output a right eye image and a left eye image on one frame image. When receiving this command, as illustrated in FIG. 2, the liquid crystal display 3 displays, for example, the right eye image and the left eye image respectively on the first image forming areas 21 and the second image forming areas 22 provided in association with a plurality of horizontal lines 23 continuously aligned in the vertical direction of the liquid crystal panel 6. Simultaneously, the controlling apparatus 12 controls the switching retarder 8 to select and control the phase difference states in the first polarizing areas 31 and the second polarizing areas 32 associated with the first image forming areas 21 and the second image forming areas 22.

Further, every time a frame is switched, the liquid crystal panel 6 and the switching retarder 8 are controlled to alternately replace image forming areas which display the right eye image and the left eye image, and display a frame image in which the right eye image and the left eye image are respectively arranged alternately. However, in order to prevent crosstalk, the controlling apparatus 12 can perform control such that the liquid crystal display 3 simultaneously displays the right eye image and the left eye image on one frame image and then does not replace the image forming areas in the next frame. In this case, the controlling apparatus 12 can control the liquid crystal display 3 to overwrite the images as is to display the overwritten images in at least the next one frame period, and controls the switching retarder 8 to function according to the liquid crystal display 3.

Further, when image forming areas are replaced or overwritten in this way, the controlling apparatus 12 can simultaneously control the lighting state of the backlight 2. That is, the backlight 2 is turned on in a period in which one frame image is displayed. In frames before and after the period, in which image forming areas which display the right eye image and the left eye image are replaced, it is possible to control the backlight 2 to turn off or decrease the brightness appropriately. By so doing, it is possible to prevent residual images of the right eye image and the left eye image and the above crosstalk following replacement of image forming areas from being noticed by the viewer 50.

According to the above operation method, even when areas to form a right eye image and a left eye image are replaced at a predetermined cycle following switching of a frame, the viewer 50 can reliably view only right eye image light with the right eye and view only left eye image light with the left eye. Consequently, the viewer 50 can recognize these right eye image light and left eye image light as stereoscopic images at all times without sensing the above crosstalk resulting from replacement of image forming areas.

In addition, in the case where a right eye image and a left eye image are simultaneously displayed on one frame image, and then the images are overwritten without replacing image forming areas in the next frame as described above, the number of times to switch images decreases. As a result, smoothness of display images is lost at a common frame frequency of 60 Hz in the liquid crystal display 3. Further, the backlight 2 is flashed at a cycle of 30 Hz per frame. Therefore, there is a concern that the viewer 50 notices this flashing of the backlight 2 via the resulting flicker.

Hence, it is preferable to increase the frame frequency in the liquid crystal display 3 to, for example, 120 Hz or more. By so doing, even when a right eye image and a left eye image are simultaneously displayed on one frame image and are overwritten as is without replacing image forming areas in the next frame, it is possible to form stereoscopic images matching the frame frequency of 60 Hz. As a result, the number of times to switch images increases and there is no concern that the viewer 50 notices flickers. Further, flickers resulting from flashing of the above backlight 2 are not noticed by the viewer 50. Consequently, the stereoscopic image display apparatus 1 according to the present embodiment provides natural display images.

In addition, in the stereoscopic image display apparatus 1 according to the present embodiment, it is possible to set the frame frequency to 240 Hz in the liquid crystal display 3 according to control by the controlling apparatus 12. In this case, for example, a right eye image and a left eye image are simultaneously displayed on one frame image in the liquid crystal display 3, and are overwritten as is without replacing image forming areas in the next frame. Further, image forming areas are replaced in the next frame, and images are overwritten in the subsequent frame. The controlling apparatus 12 can perform control according to this pattern. That is, according to a pattern of repeating, replacing and overwriting display areas of a right eye image and a left eye image in the liquid crystal display 3 and overwriting the images per frame in this order, the controlling apparatus 12 can control image formation.

When images are formed on the liquid crystal display 3 at such a cycle, a stereoscopic image matching the frame frequency of 120 Hz can be formed, and the number of times to switch images increases. As a result, there is no concern that the viewer 50 notices flickers. Further, the backlight 2 is flashed at the cycle of 120 Hz. Consequently, there is no concern that the viewer 50 notices flickers.

Further, when the frame frequency is 240 Hz in the liquid crystal display 3, the controlling apparatus 12 can perform control such that a right eye image and a left eye image are simultaneously displayed on one frame image by switching a frame, and then images are overwritten as is without replacing image forming areas in subsequent three frames. In this case, it is also possible to display the overwritten images on the liquid crystal display 3 in the next three frame periods and form stereoscopic images matching the frame frequency of 60 Hz.

In this case, the backlight 2 can be turned off for a $1/240$ second, which is the first one frame period, and the backlight 2 can be turned on in $3/240$ seconds, which are three frame periods in which the overwritten images are displayed. In this case, compared to the above pattern of repeating replacing display areas of a right eye image and a left eye image in the liquid crystal display 3 per frame and overwriting the images as is, the number of times to replace image forming areas decreases. However, it is possible to reduce the period in which the backlight is turned off according to the number of times of replacements. As a result, in the stereoscopic image display apparatus 1 it is possible to increase the brightness of stereoscopic images.

Further, in this case, the backlight 2 is flashed at the cycle of 60 Hz. Consequently, there is no concern that the viewer 50 notices flickers resulting from flashing of the backlight 2.

As described above, by increasing the frame frequency of the liquid crystal display 3 to 120 Hz or 240 Hz, the viewer 50 can enjoy natural and high-quality stereoscopic images.

Further, with the second operation method example, for the above problem, the stereoscopic image display apparatus 1 according to the present embodiment can reduce crosstalk resulting from an information update of a frame image while maintaining a high brightness without allowing the viewer to notice the flashing operation of the backlight 2.

That is, in the liquid crystal display 3, when a frame image is switched, the screen is sequentially updated from the upper horizontal line to the lower horizontal line on the screen of the liquid crystal display 3. Further, in synchronization with this update, the phase difference states of the first polarizing areas 31 and the second polarizing areas 32 are switched in the switching retarder 8. By so doing, it is possible to reduce crosstalk.

FIGS. 13(*a*) to (*f*) are views describing the second operation method of the stereoscopic image display apparatus 1 according to the present embodiment.

As described above, the controlling apparatus 12 of the stereoscopic image display apparatus 1 according to the present embodiment illustrated in FIG. 12 commands the liquid crystal display 3 to simultaneously output a right eye image and a left eye image on one frame image. Further, when receiving this command, the liquid crystal display 3 forms, for example, the following image on the liquid crystal panel 6 forming the liquid crystal display 3. That is, as illustrated in FIG. 13(*a*), a right eye image and a left eye image are displayed on the first image forming areas 21 and the second image forming areas 22, respectively, which are each formed with a plurality of horizontal lines continuously aligned in the vertical direction and which are alternately arranged.

Further, at the same time, as illustrated in FIG. 13(*b*), the controlling apparatus 12 controls the switching retarder 8, and selects and controls the phase difference states such that the left eye and the right eye of the viewer 50 can appropriately sense the right eye image and the left eye image per first polarizing area 31 and second polarizing area 32 associated with the first image forming areas 21 and the second image forming areas 22.

In addition, in FIG. 13(*a*), arrows are shown in the first image forming areas 21 and the second image forming areas 22. The directions of these arrows serve to distinguish between a right eye image and a left eye image to be output. Hence, when a right eye image is output, a rightward arrow is shown and, when a left eye image is output, a leftward arrow is shown. The same applies to FIGS. 13(*c*) and 13(*e*).

Further, as described below, in a first image forming area 21*a* in which an arrow is not shown in FIG. 13(*c*), a right eye image and a left eye image are being switched in horizontal lines in this area.

The same applies to FIG. 13(*d*) and, in a first polarizing area 31*a* associated with the first image forming area 21*a*, the phase difference state is being switched.

Further, the liquid crystal panel 6 and the switching retarder 8 are controlled following switching of a frame to alternately replace or overwrite image forming areas which display a right eye image and a left eye image, and display a frame image in which the right eye image and the left eye image are alternately arranged.

Figure 13E:
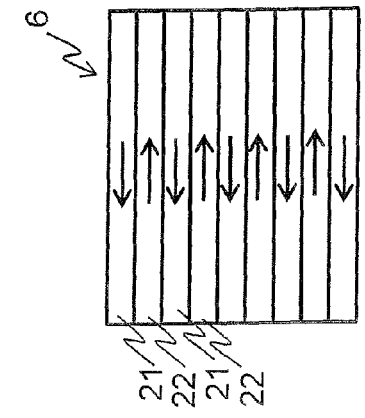
FIG. 13 is a view describing a right eye image and a left eye image displayed on the liquid crystal panel.
Figure 13C:
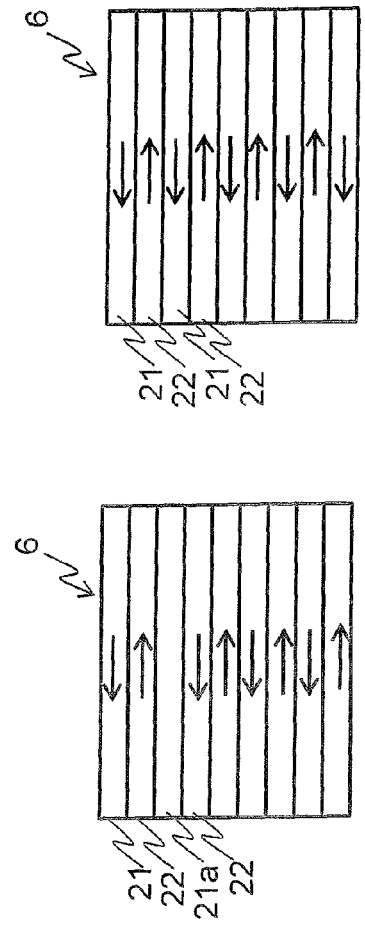
Figure 13A:
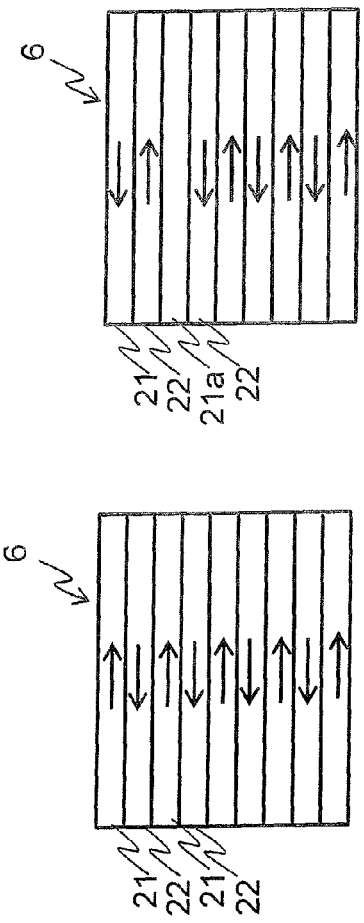

In this case, in the liquid crystal panel 6, when image forming areas which display the right eye image and the left eye image are alternately replaced, as illustrated in FIG. 13(c), the screen is sequentially updated from the upper horizontal line of the screen to the lower horizontal line. In FIG. 13(c), the first image forming area 21a is an area in which a right eye image and a left eye image are being switched in horizontal lines in this area.

In this case, the switching retarder 8 does not wait for the phase difference states to switch until the entire screen of the liquid crystal panel 6 is replaced according to control by the controlling apparatus 12. As illustrated in FIG. 13(d), even in the switching retarder 8, it is possible to switch the phase difference state of the first polarizing areas 31 and the phase difference state of the second polarizing areas 32 in association.

That is, by controlling a signal synchronized with a scan signal for forming an image in the liquid crystal panel 6, as illustrated in FIG. 13(d), following an update of the screen of the liquid crystal panel 6, the phase difference states of the corresponding first polarizing areas 31 and second polarizing areas 32 of the switching retarder 8 are switched per area.

Figure 13F:
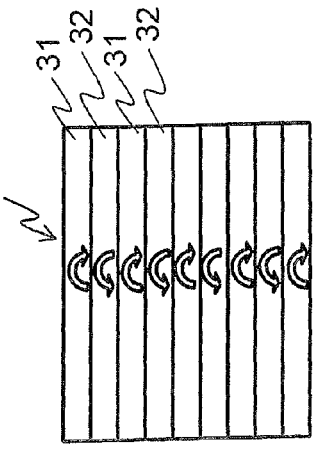
Figure 13D:
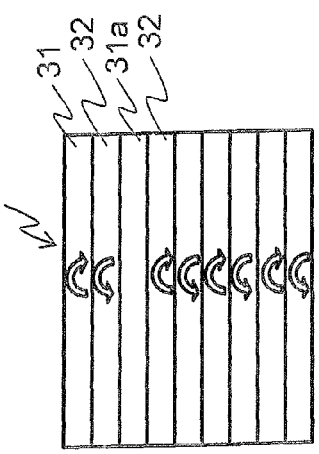
Figure 13B:
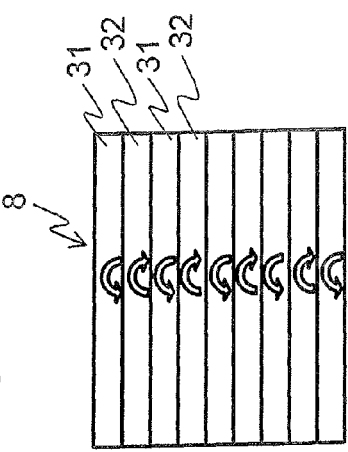

Further, when, as illustrated in FIG. 13(e), updating of images of the entire screen of the liquid crystal panel 6 is finished, as illustrated in FIG. 13(f), switching of the phase difference states of the entire first polarizing areas 31 and second polarizing areas 32 of the switching retarder 8 is simultaneously finished.

By adopting the above operation method, even when areas for forming a right eye image and a left eye image are replaced at a predetermined cycle following switching of a frame, the viewer 50 can view only right eye image light with the right eye, and view only left eye image light with the left eye. Consequently, the viewer 50 does not sense the above crosstalk resulting from replacement of the image forming areas, and can recognize these right eye image light and left eye image light as stereoscopic images at all times.

Further, the stereoscopic image display apparatus 1 does not need to turn off the entire backlight 2 even in a frame in which image forming areas which display a right eye image and a left eye image on the liquid crystal panel 6 are replaced. As a result, the stereoscopic image display apparatus 1 can display bright stereoscopic images.

Further, it is also possible to use a scanning backlight technique in combination. With the above second operation method in particular, the phase difference states are switched in the switching retarder 8 per first polarizing area 31 and second polarizing areas 32, so that using this scanning backlight technique in combination is effective.

That is, according to control by the controlling apparatus 12, it is possible to scan the backlight in conjunction with switching of the phase difference state of the first polarizing areas 31 and the phase difference state of the second polarizing area 32 in the switching retarder 8. In this case, according to control by the controlling apparatus 12, the backlight is turned off or the brightness is decreased at a portion corresponding to a position of an area at which the phase difference states are switched in the switching retarder 8. As a result, it is possible to prevent crosstalk while keeping a decrease in the brightness at minimum.

The present invention is not limited to the above-mentioned embodiments and may be utilized without departing from the spirit and scope of the present invention.

REFERENCE SIGNS LIST

1 Stereoscopic image display apparatus
2 Backlight
3 Liquid Crystal Display
5, 7, 45a, 45b Polarizing plate
6 Liquid Crystal Panel
8 Retarder
10 Polarizing glass
12 Controlling apparatus
21, 21a First image forming area
22 Second image forming area
23 Horizontal line
31, 31a First polarizing area
32 Second polarizing area
41 Right eye glass
42 Left eye glass
43a, 43b ¼ Wave plate
50 Viewer
101 Adhesive
104, 105, 114, 115 Substrate
106, 116 Liquid Crystal
117, 118 Oriented Films
119, 120 Transparent Electrodes
121 Phase Difference Film
122 Black Stripe
201, 202, 203, 206, 207, 208, 211, 212, 213, 216, 217, 218, 221, 222, 223, 226, 227, 228 Linear Polarized Light
204, 205, 209, 210, 214, 215, 219, 220, 224, 225, 229, 230 Circular Polarized Light
300 Passive Driving Liquid Crystal Display Element
301 Lower Electrodes
302 Upper Electrodes
310 Conventional active driving liquid crystal element
311, 321 Signal Lines
312, 320 Scan Lines
313, 323 Active Element
314 Pixel Electrodes

The invention claimed is:
1. A stereoscopic image display apparatus comprising:
a liquid crystal display having opposed back and front sides and which comprises a liquid crystal panel including a plurality of horizontal rows of aligning pixels, the horizontal rows of aligning pixels being arranged in a vertical direction of the liquid crystal panel, and a pair of polarizing plates which sandwich the liquid crystal panel;
a backlight located at the back side of the liquid crystal display;
an optical unit at the front side of the liquid crystal display;
polarized eyeglasses worn by a viewer in viewing images on the liquid crystal display from the front side of the liquid crystal display;
a control apparatus which controls image display on the liquid crystal display, and phase difference states of the optical unit, wherein
the liquid crystal display comprises a plurality of first image forming areas and a plurality of second image forming areas,
each of the first image forming areas includes a plurality of the horizontal rows of aligning pixels, with the horizontal rows of aligning pixels contiguously arranged in the vertical direction of the liquid crystal panel,
each of the second image forming areas includes a plurality of the horizontal rows of aligning pixels, with the horizontal rows of aligning pixels contiguously arranged in the vertical direction of the liquid crystal panel, the first and second image forming areas are alternately disposed in the vertical direction of the liquid crystal panel, under control of the control apparatus, the first image forming areas display one of a right eye image and a left eye image, and the second image forming areas simultaneously display the other of the right eye image and the second eye image, the control apparatus controls the first image forming areas and the second image forming areas so that
  (1) the right eye image and the left eye image are replaced every time a frame is switched, or
  (2) the right eye image and the left eye image are replaced when a frame is switched or images displayed in an immediately previous frame are overwritten, and the optical unit includes a plurality of first polarizing areas and a plurality of second polarizing areas which are arranged in correspondence with the first image forming areas and the second image forming areas, respectively, and which comprise respective, different, phase difference states, and the different phase difference states are controlled by the control apparatus in synchronization with timing of replacement of the right eye image and the left eye image.

2. The stereoscopic image display apparatus according to claim 1, wherein, in the optical unit, under control of the control apparatus, the first polarizing areas and the second polarizing areas comprise respective, different, phase difference states, and the different phase difference states are replaced between the first polarizing areas and the second polarizing areas in synchronization with the timing of replacement of the right eye image and the left eye image on the liquid crystal display.

3. The stereoscopic image display apparatus according to claim 1, wherein each of the first image forming areas and the second image forming areas comprises 2 to 60 horizontal rows of the horizontal rows of aligning pixels, contiguously arranged in the vertical direction of the liquid crystal panel.

4. The stereoscopic image display apparatus according to claim 1, wherein lighting state of the backlight is controlled by the control apparatus according to the timing of replacement of the right eye image and the left eye image, or a part of a lighting state of the backlight is controlled for scanning following replacement of phase difference states between the first polarizing areas and the second polarizing areas.

5. The stereoscopic image display apparatus according to claim 1, wherein the control apparatus controls replacement of the right eye image and the left eye image on the liquid crystal display by controlling each horizontal row of aligning pixels of the liquid crystal display, and, in synchronization with the control in each of the horizontal rows of aligning pixels, the control apparatus controls a phase difference state of the first polarizing areas or the second polarizing areas of the optical unit associated with the first image forming areas or the second image forming areas, including the horizontal row of aligning pixels of the liquid crystal display that is controlled.

6. The stereoscopic image display apparatus according to claim 5, wherein the control apparatus sequentially controls each horizontal row of aligning pixels, from an upper horizontal row of alignings pixels of the liquid crystal display to a lower horizontal row of aligning pixels, to control replacement of a right eye image and a left eye image, and sequentially controls replacement of phase difference states between the first polarizing areas and the second polarizing areas in the optical unit, in synchronization with the control of the liquid crystal display, from top to bottom, of the optical unit.

7. The stereoscopic image display apparatus according to claim 1, wherein the optical unit includes a pair of substrates sandwiching a liquid crystal material, transparent electrodes disposed on opposing inner surfaces of the substrates which sandwich the liquid crystal material, and phase difference films on outer surfaces of the substrates which sandwich the liquid crystal material.

8. The stereoscopic image display apparatus according to claim 1, including a light blocking units located in at least part of boundaries between adjacent pairs of first and second polarizing areas of the optical unit.

9. The stereoscopic image display apparatus according to claim 1, wherein the optical unit includes a liquid crystal element selected from the group consisting of a TN liquid crystal element, a homogeneous liquid crystal element, and a ferroelectric liquid crystal element.

10. The stereoscopic image display apparatus according to claim 7, wherein a substrate of the optical unit includes a film selected from the group consisting of a polycarbonate film, a triacetylcellulose film, a cycloolefin polymer film, a polyether sulfone film, and a glass cloth reinforced transparent film.

11. The stereoscopic image display apparatus according to claim 1, wherein the liquid crystal display switches frames at a frequency of at least 120 Hz.

12. The stereoscopic image display apparatus according to claim 11, wherein the liquid crystal display switches frames at a frequency of at least 240 Hz.

* * * * *